(12) United States Patent  (10) Patent No.: US 6,727,429 B1
Koessler  (45) Date of Patent: Apr. 27, 2004

(54) JUNCTION BOX

(75) Inventor: Juergen Koessler, 902-1736 West 10th Avenue, Vancouver, British Columbia (CA), V6J 2A6

(73) Assignee: Juergen Koessler, Vancouver (CA)

(*) Notice: Subject to any disclaimer, the term of this patent is extended or adjusted under 35 U.S.C. 154(b) by 18 days.

(21) Appl. No.: 10/294,652

(22) Filed: Nov. 15, 2002

(51) Int. Cl.7 .................................................. H02G 3/18
(52) U.S. Cl. ............................ 174/50; 174/60; 174/66; 174/67
(58) Field of Search .............................. 174/60, 66, 67, 174/50; 70/14, 113

(56) References Cited

U.S. PATENT DOCUMENTS 4,702,541 A * 10/1987 Arnold ........................ 439/304
5,743,116 A * 4/1998 Suster ............................ 70/14
6,006,556 A * 12/1999 Daoud ............................ 70/56

OTHER PUBLICATIONS

Excerpt from 1999 Primex Catalogue, pp 13–14 including cover page and table of contents.

* cited by examiner

Primary Examiner—Dean A. Reichard
Assistant Examiner—Jinhee Lee
(74) Attorney, Agent, or Firm—Oyen Wiggs Green & Mutala

(57) ABSTRACT

A junction box has a base member and a lid member. A plurality of concentric flanges extend from surfaces of the base member. The flanges can receive conduits. Knock out elements are located within the diameters of the flanges. The knock out elements may be removed to permit cables to pass into an interior of the junction box. The lid is hinged to the base member and can be held shut by a clasp assembly.

43 Claims, 22 Drawing Sheets

JUNCTION BOX

TECHNICAL FIELD

The invention pertains to apparatus for housing electrical connections and/or other electrical components. Particular embodiments of the invention have application housing terminal connectors for telephone, cable television and/or other telecommunications lines.

BACKGROUND

In the telecommunications industry, it is often necessary to electrically connect and/or reconfigure connections by way of which telecommunications signals are provided to subscribers. Such connections may have to be made or to be reconfigured to provide service to one or more subscribers in a building, a group of buildings or individual units within a building.

It is desirable to provide a plurality of relatively easily replaceable, interchangeable and reconfigurable connections in a single location (for a particular building, for example), such that connections and/or changes to connections may be made with a minimum effort. A device capable of providing one or more electrical connections is referred to herein as a "terminal connector".

There is a general desire to locate terminal connectors in weather resistant housings which may be conveniently located in outdoor locations, such that connections may be made, changed and/or reconfigured by service technicians of telecom companies or other service providing organizations without having to enter buildings.

SUMMARY OF THE INVENTION

A junction box for receiving electrical cables and for housing electrical components is disclosed. The apparatus comprises a base member having a recessed region and a lid member positionable over the recessed region of the base member to form an enclosure. The lid member and the base member are coupleable on one side by one or more hinges and on a side opposite the one or more hinges by a clasp assembly. The clasp assembly is capable of being locked and unlocked by two independent locking mechanisms.

A plurality of concentric lower flanges may extend from a lower surface of the base member, such that a first cable conduit may be slidably engaged to one of the plurality of lower flanges.

A plurality of concentric upper flanges may extend from an upper surface of the base member, such that a second cable conduit may be slidably engaged to one of the plurality upper flanges. One or more upper knock-out elements may be located on the upper surface of the base member inside a diameter of the outermost one of the plurality of concentric upper flanges. The one or more upper knock-out elements may be removable from the base member to form an upper aperture therein, such that a cable may extend from an interior of the second cable conduit through the upper aperture and into the enclosure.

Further features and applications of the invention are described below.

BRIEF DESCRIPTION OF THE DRAWINGS

In drawings which depict non-limiting embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The invention disclosed herein relates to a junction box apparatus for housing one or more terminal connectors and/or other electrical components. Although it may be used for a wide variety of applications, the junction box of the present invention is particularly suited for housing surge protecting terminal connectors, which are widely used in the telecommunications industry. The junction box is designed with a number of features making it suitable for outdoor use. Such features include: a locking clasp mechanism that simultaneously provides security for the junction box and dual accessibility to the junction box for both subscribers and service technicians; a terminal connector platform located on the junction box lid to provide easy access to terminal connectors housed in the junction box, such that connections may be safely and easily made, changed and/or reconfigured; a plurality of "knock-out" apertures at various locations on the base of the junction box that provide access to the junction box for various types of cables and conduits; mounting features located on the base of the junction box (i.e. away from the terminal connectors and/or other components) which permit the junction box to be mounted to the outside of a building or other support structure via a variety of fasteners; and sealed cable entry and water drainage features that help to weatherproof the junction box and the terminal connectors and/or other components housed therein. These features may be provided individually or in any combination.

Throughout the following description, the term "cable" is used to describe any wire, conduit, cable or the like which is capable of carrying electrical signals or power. As used in the following description, "cable(s)" may comprise one individual cable or a plurality of individual cables. "Cable(s)" should also be understood to include fiber optic cables and pluralities of individual cables which may be grouped together and enclosed in a single sheath or conduit. In general, cables used to carry telecommunications signals comprise two individual cables, one of which is a ground cable and the other of which is a signal carrying cable. In operation, the junction box of the present invention receives one or more cables and houses one or more terminal connectors (and/or other electrical components). Terminal connectors facilitate connections between the various cables received by the junction box.

Figure 8:
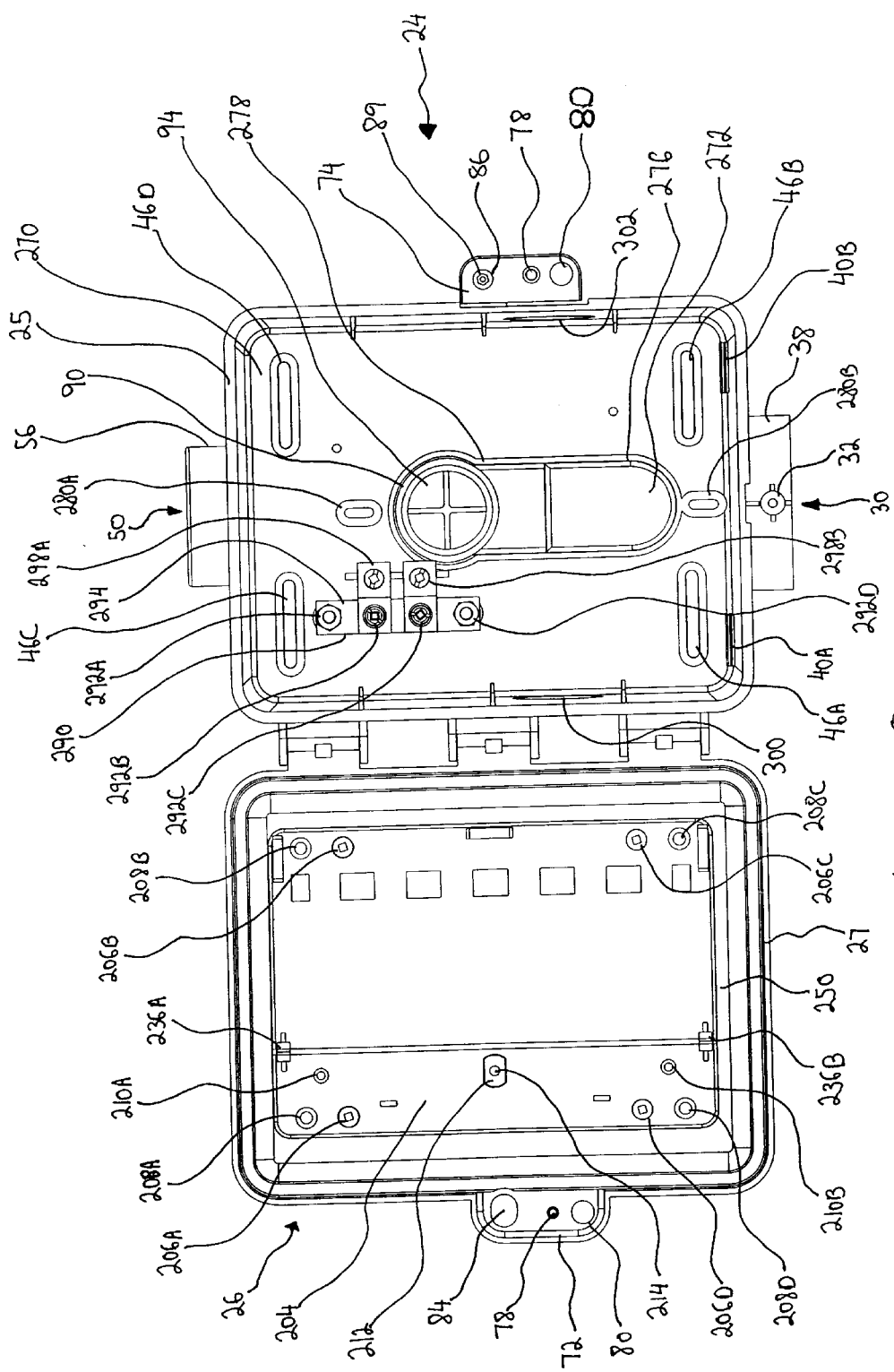
FIG. 8 is an elevated plan view of the junction box of FIG. 1 in an open configuration.

FIGS. 1 through 7 depict various views of a junction box 10 according to a particular embodiment of the invention in a closed configuration. FIG. 8 depicts junction box 10 in an open configuration.

When junction box 10 is in its closed configuration depicted in FIGS. 1 through 7, junction box 10 forms a substantially hollow, six sided enclosure having a front side 14, a back side 20, a bottom side 16, a top side 18, a clasp side 12 and a hinge side 22. Preferably, junction box 10 is made out of PVC, another plastic or another suitably non-conducting, waterproof and flame-retardant material.

Throughout the following description, a number of conventions are employed to simplify the explanation of the invention. Where the invention comprises a plurality of similar elements, the individual elements are referred to using a reference numeral followed by a letter (for example, hinge 44A) and the group of elements is referred to collectively using the reference numeral alone (for example, hinges 44). The words "inward" and "inwardly" refer to a direction that extends from the outside of junction box 10 towards the interior of junction box 10. Similarly, the words "outward" and "outwardly" refer to a direction that extends from the interior of junction box 10 towards the outside of junction box 10.

Figure 1:
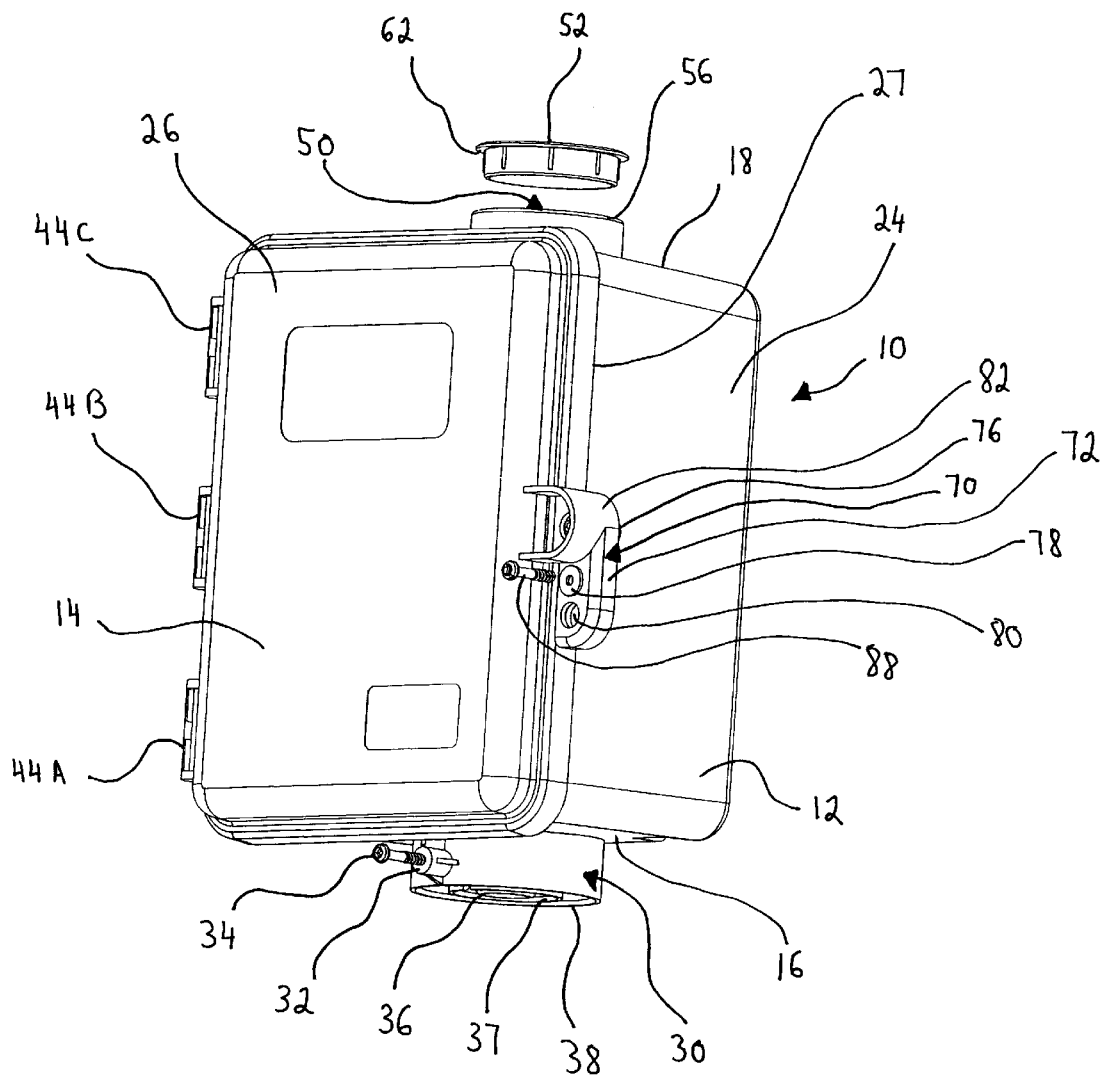
FIG. 1 is an isometric view of a junction box in a closed configuration according to one embodiment of the invention.
Figure 2:
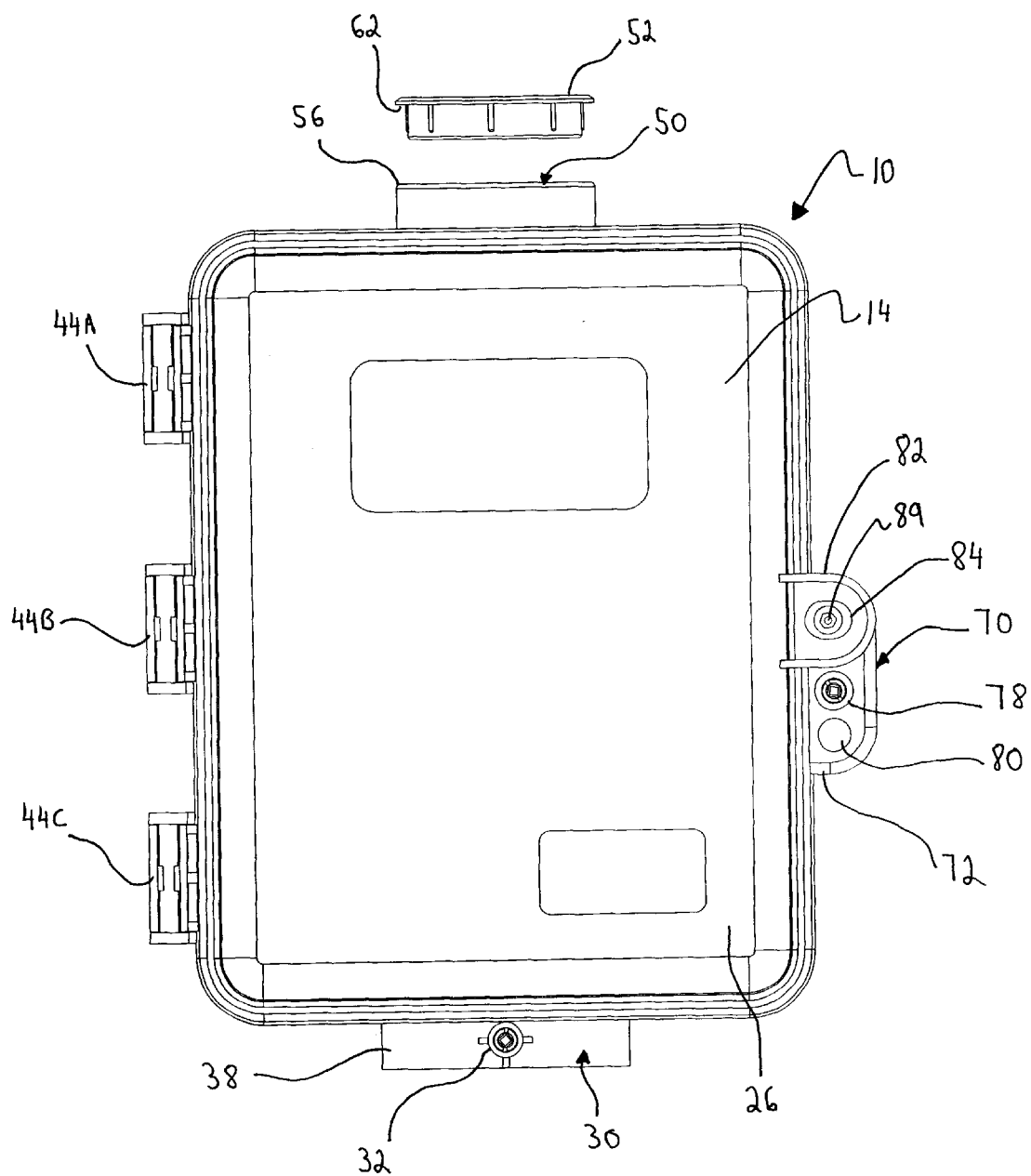
FIG. 2 is an elevated plan view of a front side of the junction box of FIG. 1.

Junction box 10 comprises a base member 24 and a lid member 26, which are joined to one another on hinge side 22 by a plurality of hinges 44. Hinges 44 facilitate pivotal movement of lid member 26 relative to base member 24, such that lid member 26 may swing open from base member 24 on clasp side 12. In the closed configuration of FIGS. 1 through 7, clasp assembly 70 may fasten lid member 26 to base member 24 on clasp side 12. In the illustrated embodiment, the height and width of lid member 26 are slightly larger than the height and width of base member 24, such that the edges 25 (FIG. 8) of base member 24 fit slidably inside the edges 27 of lid member 26 and edges 27 of lid member 26 slidably overlap edges 25 of base member 24. As shown in FIG. 1, the recess inside base member 24 is relatively deep in comparison to that of lid member 26.

Figure 3:
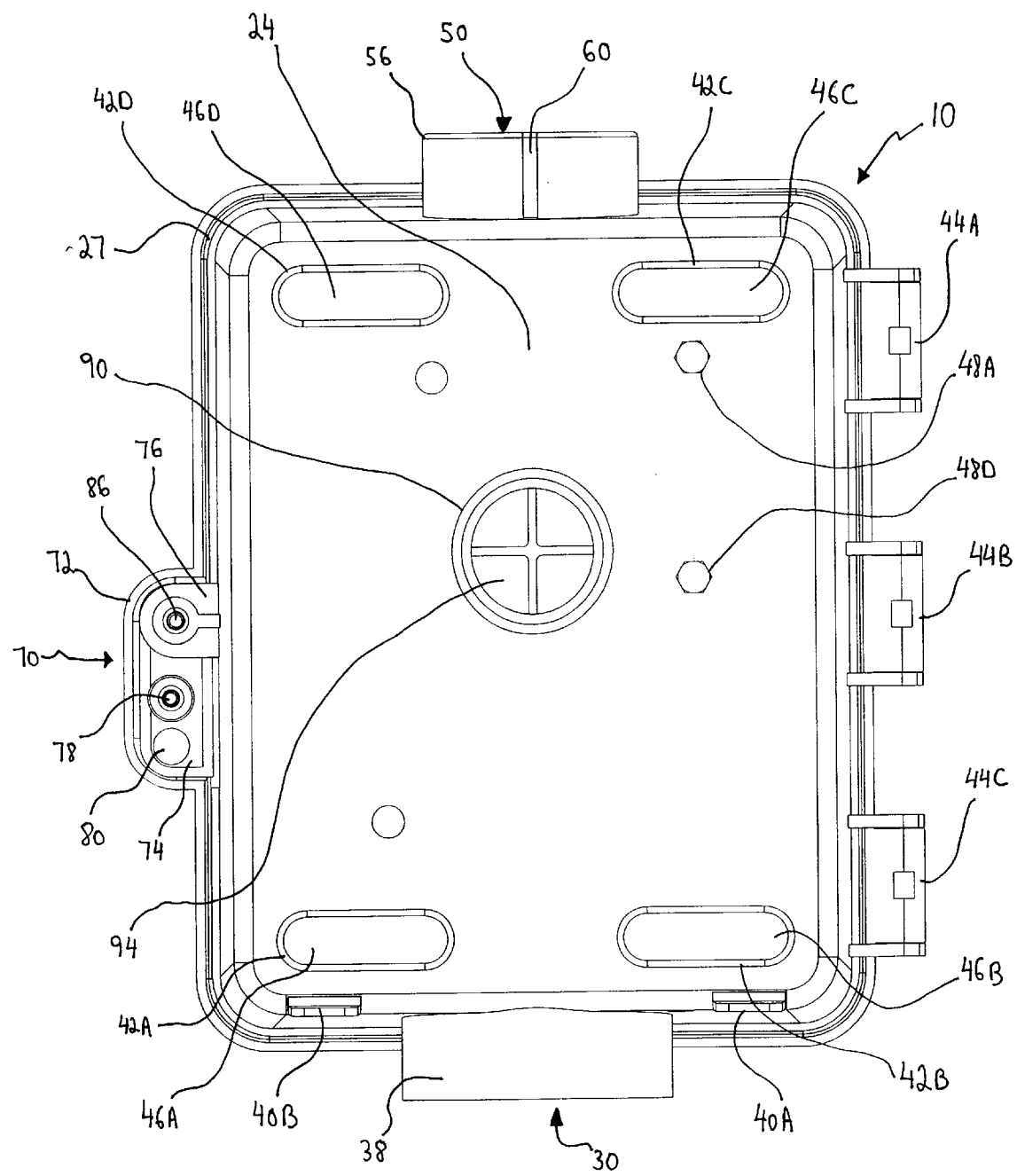
FIG. 3 is an elevated plan view of a back side of the junction box of FIG. 1.

FIG. 3 depicts back side 20 of junction box 10. Back side 20 comprises a plurality of mounting locations 46, which may be used to mount junction box 10 to the wall of a building or other suitable support structure (not shown). Screws, bolts or other fasteners (not shown) may extend from the inner surface 270 (FIG. 8) of base member 24, through apertures (not shown) in mounting locations 46 and into or through the support structure. Alternatively, screws, bolts or other fasteners may extend from the support structure, through apertures in mounting locations 46 and into junction box 10. Preferably, as shown in FIG. 3, mounting locations 46 are elongated, such that fasteners may be inserted through mounting locations 46 in a range of positions. Mounting locations 46 may comprise prethreaded apertures to accept threaded fasteners. Preferably, mounting locations 46 are surrounded by stand-off flanges 42 (FIG. 4) that extend outwardly from back side 20, such that when junction box 10 is mounted to a wall or other support structure, back side 20 of junction box 10 is separated slightly from the support structure. This separation facilitates water drainage between backside 20 and the support structure. In the illustrated embodiment (FIG. 3), junction box 10 is formed without apertures in mounting locations 46. In such embodiments, if required, apertures may be "knocked-out" of mounting locations 46 by driving fasteners through the body of junction box 10 or otherwise.

Back side 20 of junction box 10 incorporates a circularly shaped back aperture 90 (FIG. 3). Back aperture 90 facilitates direct access to the interior of junction box 10 for one or more cables (not shown). Typically, although not necessarily, such a cable extends from back side 20 of junction box 10 directly into the building or support structure to which junction box 10 is mounted. Back aperture 90 may comprise a grommet (not shown) which extends around its circular edge, such that when an electrical cable is fed through back aperture 90, a seal is formed around the cable. Such a grommet may be made of rubber, silicone or other suitable materials. Preferably, the grommet is made of materials which are elastomeric and waterproof.

In the illustrated embodiment, back aperture 90 is not in use and, consequently, is filled with a removable plug 94. Preferably, plug 94 is made out of a material or materials which are elastomeric and waterproof, such as rubber, silicone or plastic. When inserted, plug 94 provides a substantially waterproof seal with the circular edge of back aperture 90. In some embodiments (not shown), plug 94 may be pierced to provide an aperture therein. When plug 94 is pierced in this manner, it may function as a grommet to form a waterproof seal around a cable inserted through back aperture 90.

In other embodiments (not shown), plug 94 may be a "knock-out" element, which may be knocked or punched out from base member 24 to leave a corresponding aperture. A knock-out element, such as knock-out plug 94, may be implemented, for example, by forming the walls of base member 24, such that they have relatively thin regions which surround the desired shape of knock-out plug 94. In this manner, knock-out plug 94 may be removed from base member 24 (if it is desired to run a cable through back aperture 90) or, alternatively, knock-out plug 94 may be left in place in base member 24 to provide a waterproof wall.

In this description, an element referred to as a "knock-out" element, may be "knocked-out" or "punched out" from the body of junction box 10 to leave a correspondingly shaped aperture in base member 24 or lid member 26. Such a knock-out element may be formed integrally with base member 24 or lid member 26 or may be a separate piece, which snaps into base member 24 or lid member 26. Such a knock-out element may be implemented, for example, by forming the walls of junction box 10, such that they have relatively thin regions which surround the desired knock-out element. In addition, the term "knock-out" is used in this description in conjunction with the aperture which may be formed by a knock-out element. For example, in some embodiments, back aperture 90 may be a knock-out aperture, which is formed when circular knock-out plug 94 is removed from base member 24.

Figure 9:
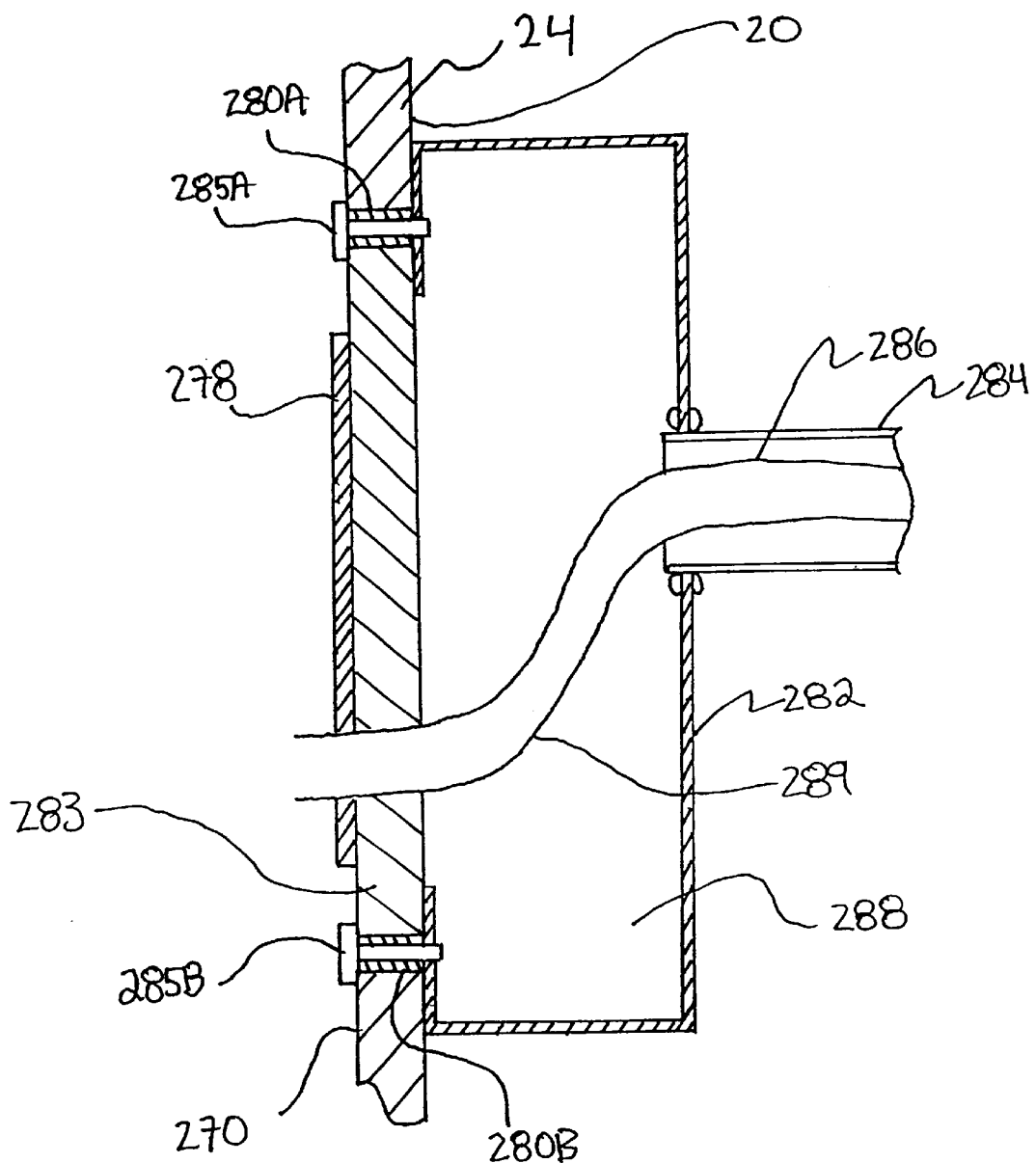
FIG. 9 is a sectional view of a particular type of cable adapter mounted to the junction box of FIG. 1.

Referring to FIGS. 8 and 9, back side 20 of base member 24 may also incorporate an elongated knock-out element 272. Knockout element 272 may comprise a semi-circular lower portion 274 and elongated sidewalls 276, which extend upward toward back aperture 90. In some embodiments (not shown) knock-out element 272 may actually comprise a plurality of smaller knock-out elements. When plug 94 is knocked-out or removed from back aperture 90 and knock-out element 272 is knocked-out of base member 24, the resultant elongated aperture 283 in the back side 20 of base member 24 is shaped to facilitate connection to a particular type of telecommunications cable adapter 282. As shown in FIG. 9, cable adapter 282 receives a conduit 284 containing cable 286 and has its own enclosed space 288 in which cable 286 has an elbow 289. Elbow 289 causes cable 286, which enters cable adapter 282 from a certain location, to exit cable adapter 282 from a different, spaced apart location.

Back side 20 of base member 24 may also comprise a plurality of mounting holes 280 which may be used to mount cable adapter 282 to base member 24. Mounting screws, bolts or other fasteners 285 may be inserted between inner surface 270 of base member 24 and cable adapter 282 through mounting holes 280. In the illustrated embodiment, mounting holes 280 are slightly elongated on their vertical dimension (FIG. 8) to provide for easier mounting. Mounting holes 280 may be knockout holes.

Inner surface 270 of base member 24 may comprise a brace 278, which extends a small distance inwardly from inner surface 270. In the illustrated embodiment, brace 278 is shaped and positioned to follow the perimeter of knock-out element 272 and back aperture 90 (FIG. 8). Brace 278 may provide additional structural support to base member 24, particularly when elongated aperture 283 is created by removing both knock-out element 272 and back aperture 90 from back side 20 of base member 24.

Figure 12:
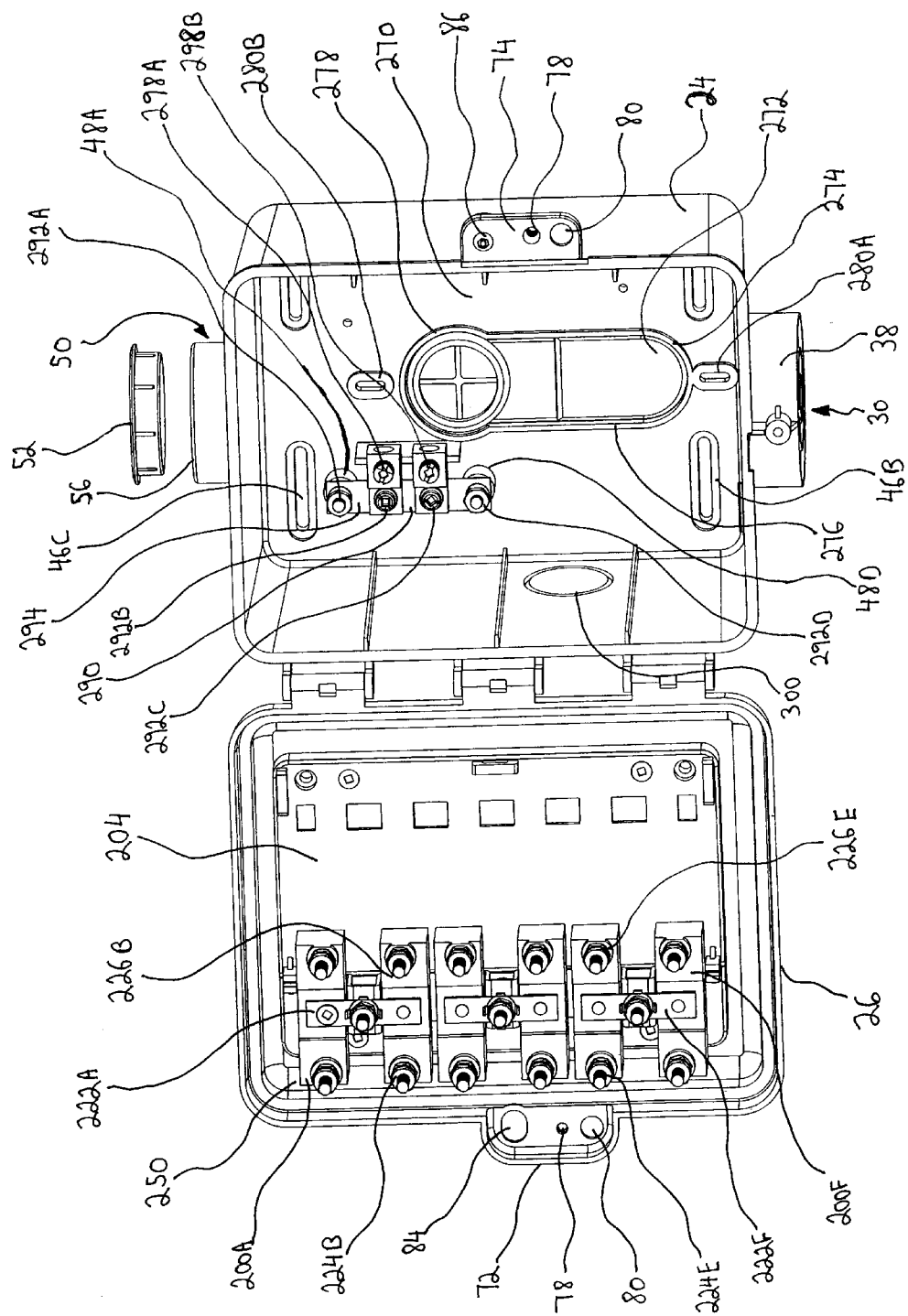
FIG. 12 depicts an isometric view of the junction box of FIG. 11 housing a first type of terminal connector.
Figure 14:
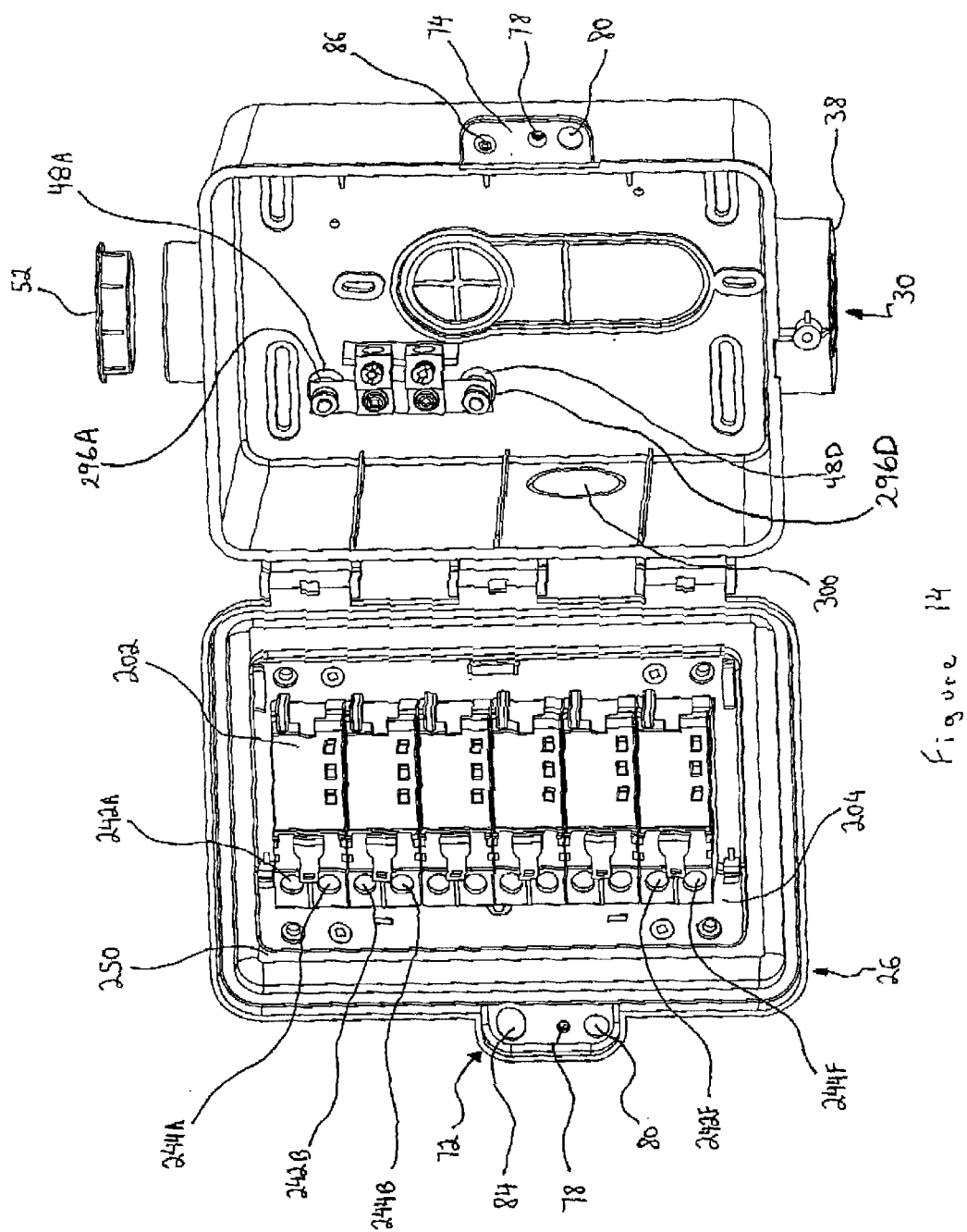
FIG. 14 depicts an isometric view of the junction box of FIG. 13 housing a second type of terminal connector.
Figure 15:
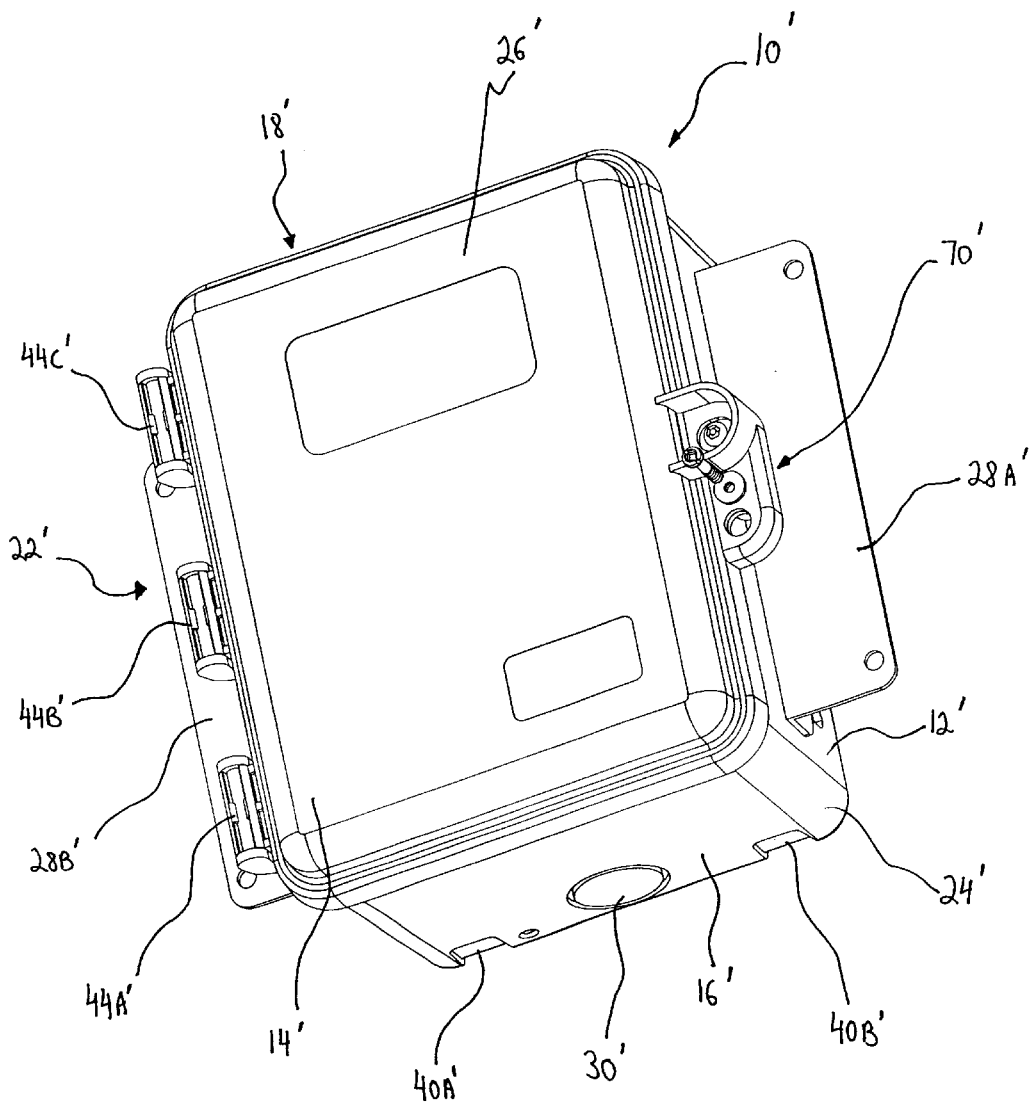
FIG. 15 is an isometric view of a junction box in closed configuration according to another embodiment of the invention.
Figure 16:
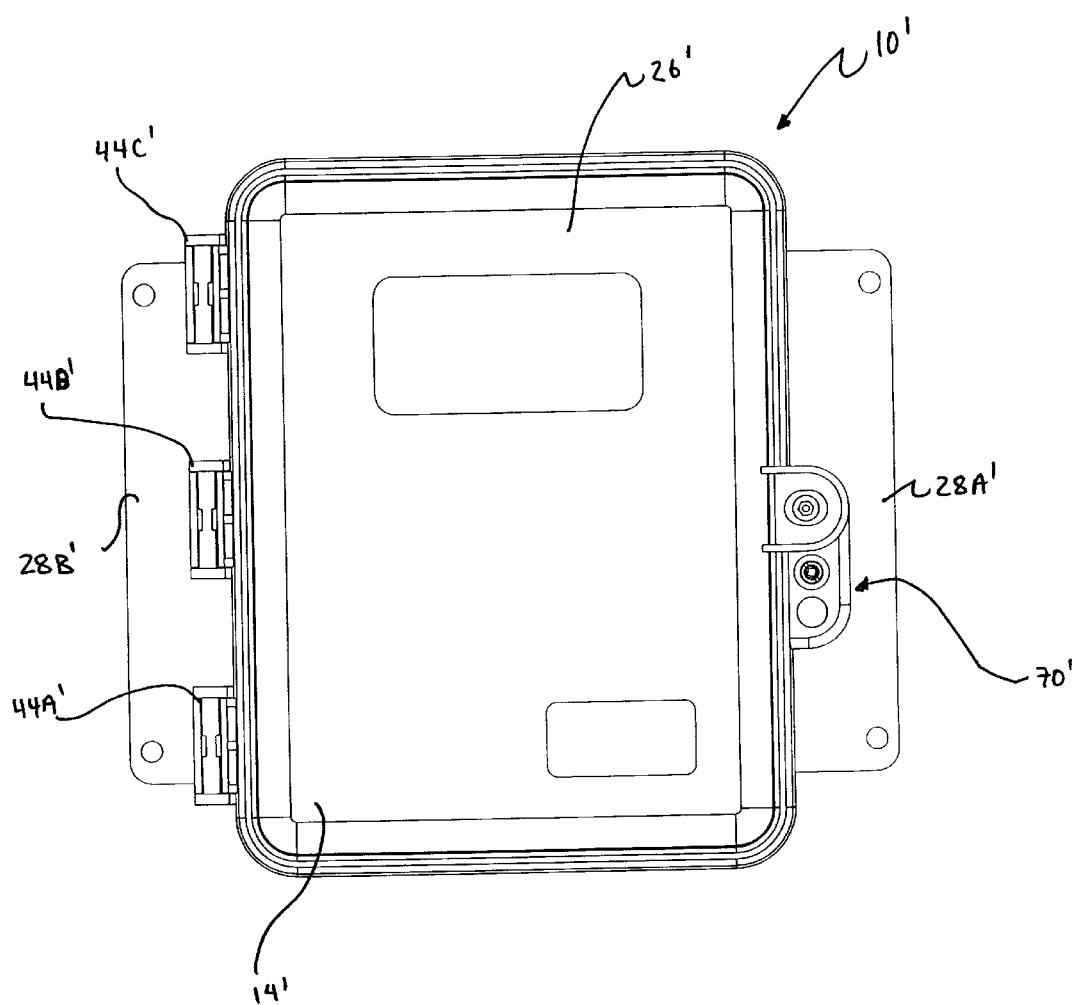
FIG. 16 is an elevated plan view of a front side of the junction box of FIG. 15.
Figure 17:
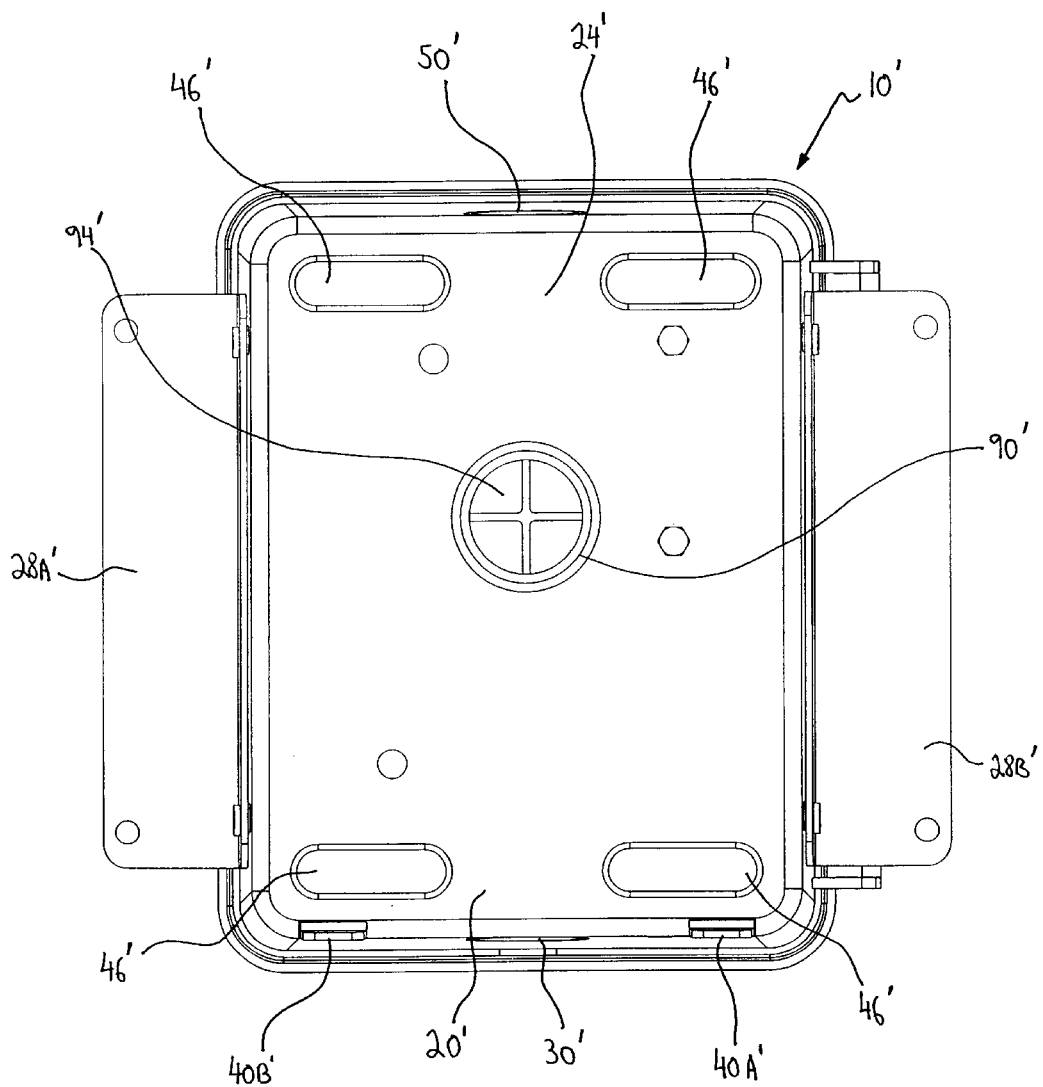
FIG. 17 is an elevated plan view of a back side of the junction box of FIG. 15.
Figure 18:
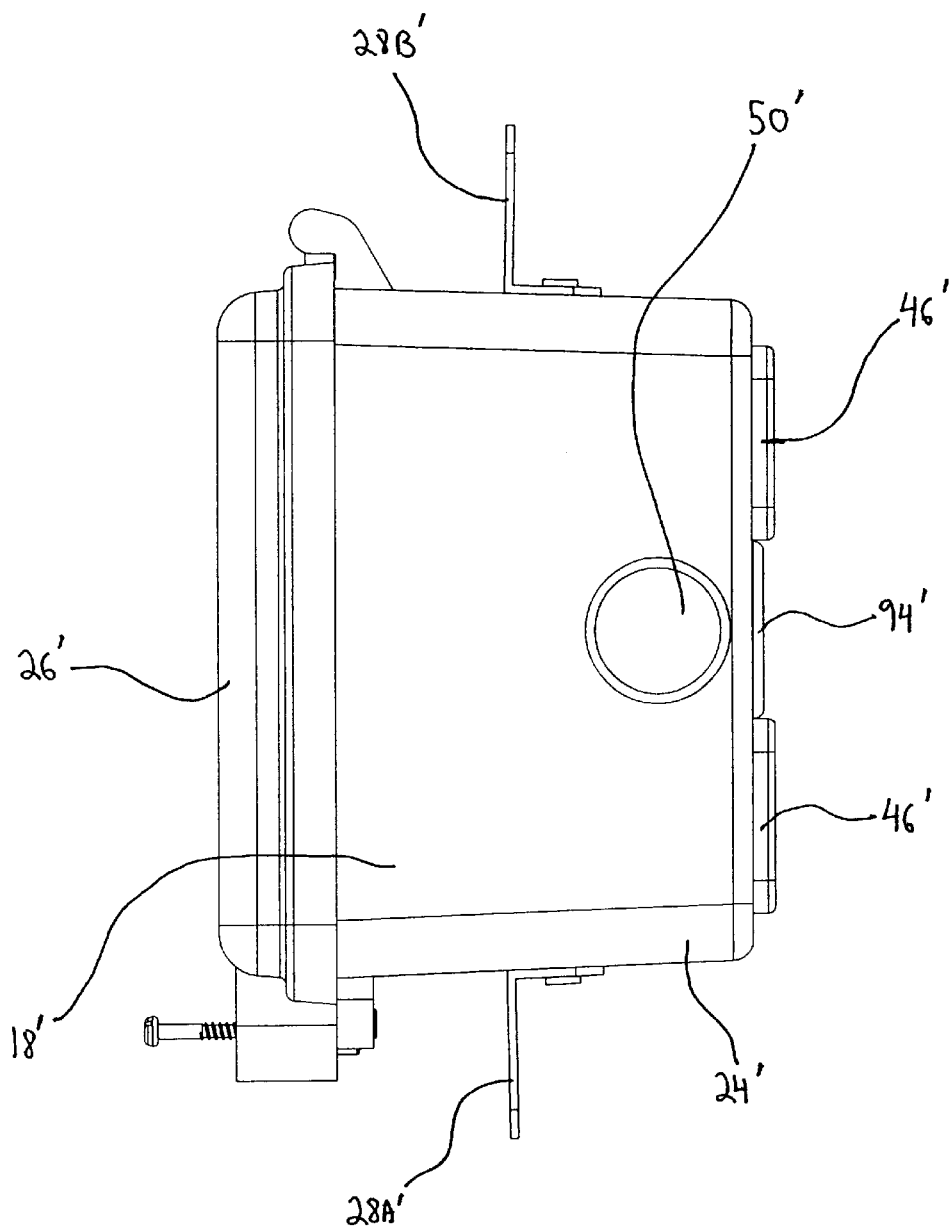
FIG. 18 is an elevated plan view of the top of the junction box of FIG. 15.
Figure 19:
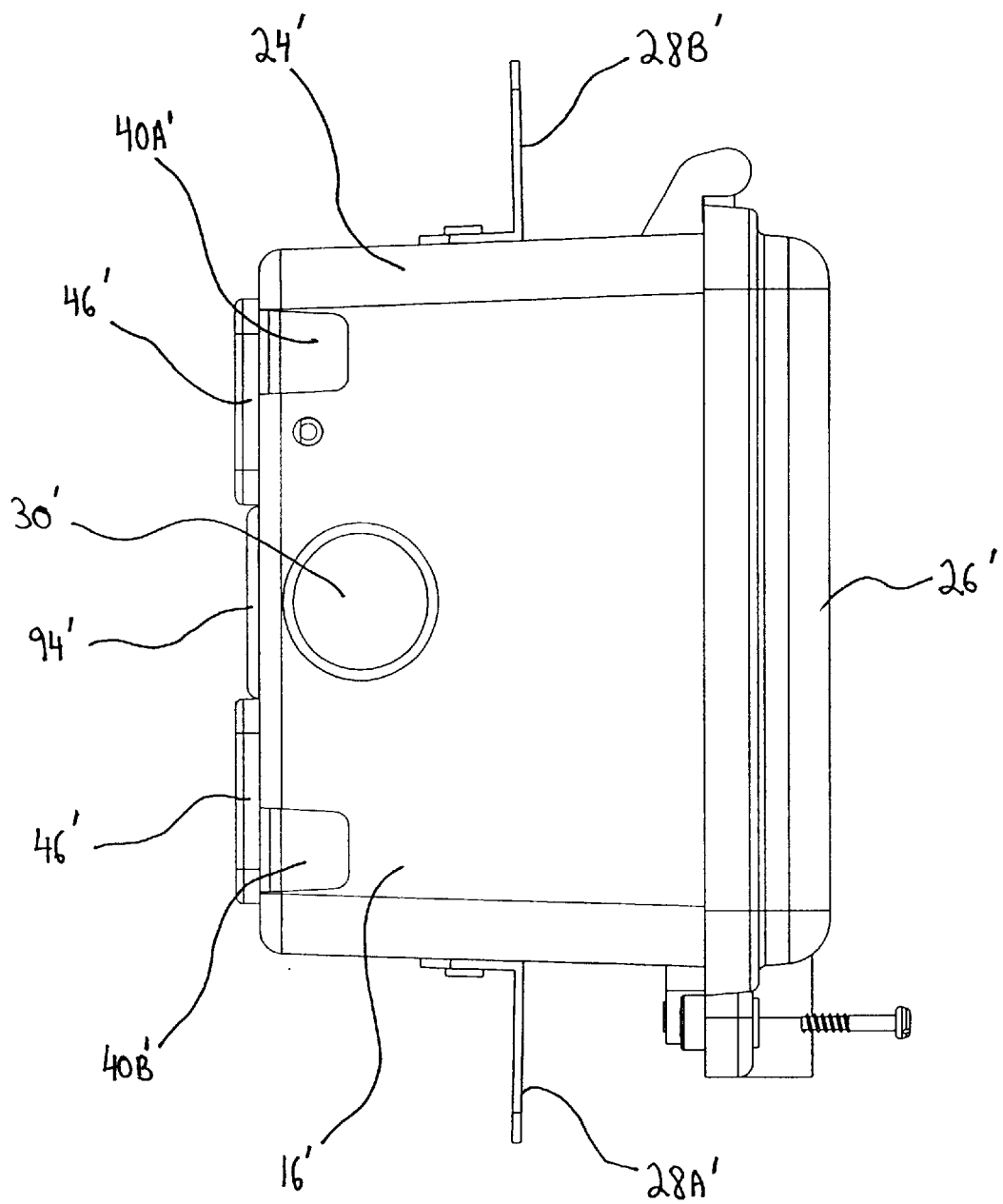
FIG. 19 is an elevated plan view of the bottom of the junction box of FIG. 15.

As shown in FIG. 8, terminal connector 290 may be mounted on the inner surface 270 of base member 24. In the illustrated embodiment, terminal connector 290 is mounted to base member 24 using fasteners 292, which extend from an inner side of terminal connector 290 into mounting holes 48 (FIGS. 12 and 14). Although the number of fasteners 292 and/or mounting holes 48 may vary in different embodiments, the illustrated embodiment includes four fasteners 292 and four associated mounting holes 48. In the illustrated embodiment, mounting holes 48 comprise stand-off extensions 296A, 296D (FIG. 14) that extend inwardly from inner surface 270 of base member 24. Preferably, mounting holes 48 are threaded.

In the illustrated embodiment, fasteners 292 comprise threaded metallic shafts (which are partially inserted into mounting holes 48) and nuts, which screw onto an inward side of the threaded shafts to hold terminal connector 290 in place. Additionally or alternatively, terminal fasteners 292 may be metallic screws, which thread through terminal connector 290 into mounting holes 48. In general, terminal connector 290 may be mounted to base member 24 by any suitable means. Preferably, however, fasteners 292 are conductive, so that they may additionally be used to form connections on terminal connector 290.

Although mounting holes 48 and terminal connector 290 may be positioned at any suitable location on an inner wall of junction box 10, the location shown in the illustrated embodiment is preferable, because this location maintains a separation between terminal connector 290 and other cables, components and terminal connectors which may be housed in junction box 10.

Terminal connector 290 includes a terminal bar 294, which extends between fasteners 292 and mounting holes 48. In typical applications, terminal bar 294 is a conductive grounding bar and extends between all of fasteners 292, such that all of fasteners 292 are electrically grounded to terminal bar 294. In alternative embodiments, terminal bar 294 may be non-conductive or may comprise a plurality of smaller terminal bars, which are electrically isolated from one another.

Cables (not shown) may be connected to terminal connector 290 using a variety of connection means, such as screw connectors, crimp connectors, apertured connectors, "U-shaped" connectors and the like. In the illustrated embodiment, terminal connector 290 is shown with two screw on connectors 298. In general, however, connectors 298 may be any type of electrical connector.

Top side 18 of base member 24 comprises a substantially circular top knock-out aperture 50 (FIG. 4), which may be used when cable access to junction box 10 is required through top side 18 of base member 24. In the illustrated embodiment, top knock-out aperture 50 comprises two concentric, substantially circular flanges: outer flange 56 and inner flange 58. Providing two flanges 56 and 58 permits conduits of different sizes to be mounted to box 10. If cable access to junction box 10 through top side 18 of base member 24 is required, then a user may remove (i.e. knock-out) a portion of knock-out aperture 50 that is interior to outer flange 56.

Preferably, the outer circumferential surface of outer flange 56 is sized to receive and slidably engage the inner circumferential surface of an industry-standard cable conduit (not shown). For example, the outer circumferential surface of outer flange 56 may be sized to receive the inner circumferential surface of a nominal 2" (50 mm) cable conduit. Although 2" steel and PVC cable conduits are widely used in the telecommunications industry, cable conduits made out of almost any material may be mounted to flange 56. The size of outer flange 56 may be varied to accommodate conduits of different sizes. Gravity and, possibly, frictional contact between the outer surface of outer flange 56 and the inner surface of the cable conduit, act to secure the conduit to junction box 10 and to provide a substantially waterproof seal. When top aperture 50 is knocked-out, a cable may be extended from the cable conduit, through top side 18 of base member 24 and into junction box 10.

Inner flange 58 is concentric with outer flange 56 and has an outer circumferential surface sized to receive and slidably engage the inner circumferential surface of a smaller-sized cable conduit (not shown). For example, the outer circumferential surface of inner flange 58 may be sized to slidably engage the inner circumferential surface of a nominal 1¼" (32 mm) Schedule 40 PVC cable conduit. Typically, in the telecommunications industry, such 1¼" cable conduits are made from PVC, but cable conduits made from almost any material may be mounted to flange 58. The size of inner flange 58 may be varied to accommodate conduits of different sizes. Gravity and the frictional contact between the outer surface of inner flange 58 and the inner surface of the cable conduit act to secure the conduit to junction box 10 and to provide a substantially waterproof seal. When top aperture 50 is knocked-out, a cable may be extended from the cable conduit, through top side 18 of base member 24 and into junction box 10.

Figure 4:
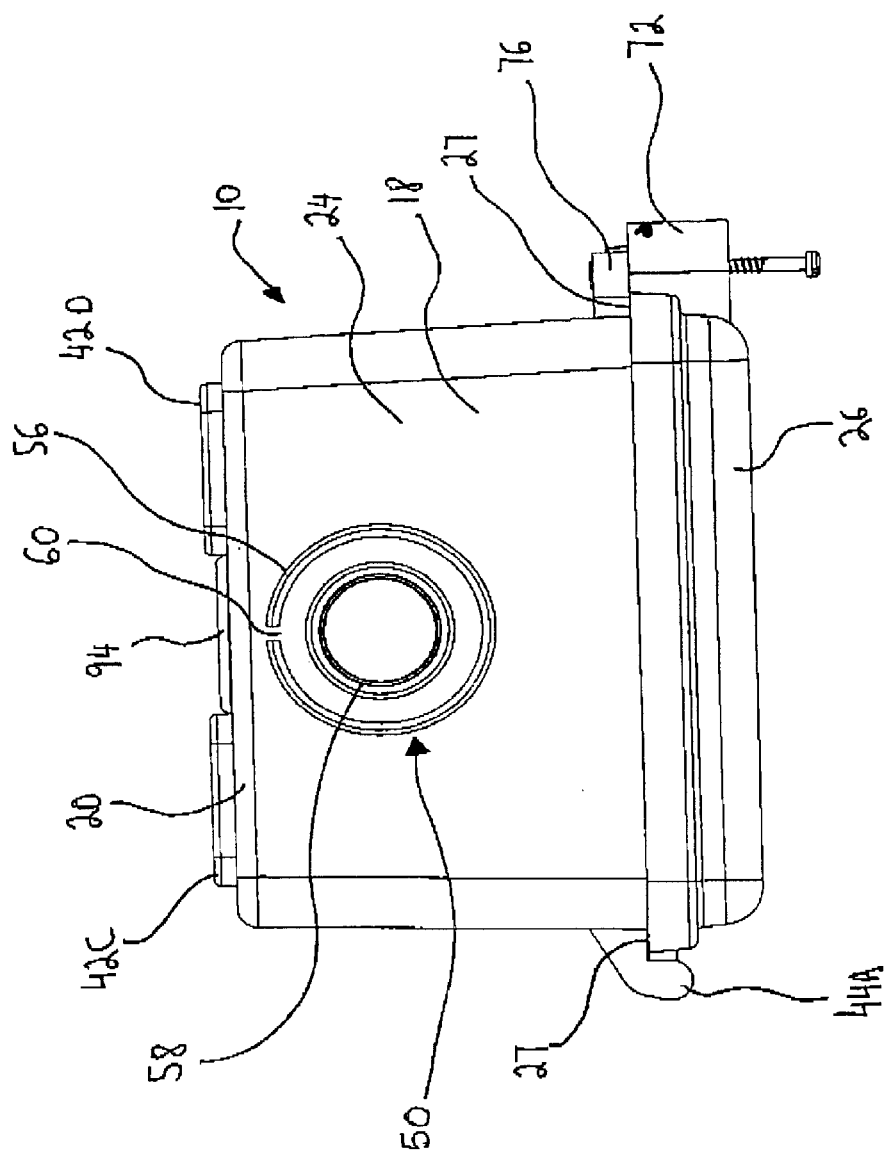
FIG. 4 is an elevated plan view of the top of the junction box of FIG. 1.

Because top aperture 50 may be exposed to rain water, it is desirable to avoid having water or moisture pool on top surface 18 of junction box 10. When a cable conduit is engaged to outer flange 56, water accumulation is not normally an issue, because water may simply drain away from top aperture 50. However, when a cable conduit is engaged to inner flange 58, water may tend to accumulate in the region between inner flange 58 and outer flange 56. For this reason, outer flange 56 includes a slot 60 that extends outwardly from the top side 18 of base member 24 to the rim of outer flange 56 (FIGS. 3 and 4). When a cable conduit is engaged to inner flange 58, slot 60 provides water drainage away from the region between inner flange 58 and outer flange 56. This drainage helps to prevent water from leaking into junction box 10 through top aperture 50.

In the illustrated embodiment, junction box 10 also comprises a circular top aperture cover 52 (FIG. 1), which is sized to slidably and frictionally engage the inner circumferential surface of outer flange 56. Cover 52 prevents water accumulation on top side 18 of junction box 10. If top aperture 50 has not been knocked-out, then cover 52 prevents water accumulation in the region inside inner flange 58. If top aperture 50 was initially knocked-out and then, at some later point in time, it is desired to close top aperture 50 (because, for example, there is no longer any need to run cable into junction box 10 through top aperture 50), then cover 52 may be placed on top aperture 50 to prevent rainwater and other moisture from entering junction box 10. Top aperture cover 52 may comprise a lip 62, which extends in a radial direction atop outer flange 56. Lip 62 helps to move water away from top aperture 50, and facilitates easy removal of cover 52 from top aperture 50.

Bottom side 16 of base member 24 comprises a substantially circular bottom knock-out aperture 30 (FIG. 5), which is used when cable access to junction box 10 is required through bottom side 16 of base member 24. In the illustrated embodiment, bottom knock-out aperture 30 includes three concentric, circular flanges: outer flange 38, inner flange 36 and middle flange 37. If cable access to junction box 10 is required through bottom side 16 of base member 24, then a user may knock-out a first knock-out element 33 from bottom knock-out aperture 30 and feed the cable through the resulting hole (not shown). Preferably, the first knock-out element 33 of bottom aperture 30 is located inside a diameter of inner flange 36. A grommet (not shown) may be used to form a seal around an inserted cable. Preferably, the grommet is elastomeric and waterproof, to prevent water from entering box 10 by way of bottom knock-out aperture 30. In alternative embodiments, bottom aperture 30 may comprise a preformed first aperture (not shown) which is preferably located inside the diameter of inner flange 36. Such a preformed first aperture may be filled with a an elastomeric plug when not in use.

Preferably, the inner circumferential surface of outer flange 38 is sized to receive and slidably engage the outer circumferential surface of an industry standard cable conduit (not shown). For example, the inner circumferential surface of outer flange 38 may be sized to receive the outer circumferential surface of a nominal 2" (50 mm) PVC Schedule 40 cable conduit, which is widely used in the telecommunications industry. Cable from the cable conduit may be inserted into junction box 10 through a knocked-out portion of bottom aperture 30.

The slidable engagement between the inner surface of outer flange 38 and the outer surface of the cable conduit may provide a friction fit that helps to secure the cable conduit to flange 38. Bottom aperture 30 also comprises a screw-hole 32, which extends outwardly from an outer circumferential surface of flange 38. To assist with securing the cable conduit to flange 38, fastening screw 34 (FIG. 1) may be inserted through screw-hole 32 and flange 38 to bear against the outer surface of the cable conduit.

Middle flange 37 is concentric with outer flange 38 and has an inner circumferential surface sized to receive and slidably engage the outer circumferential surface of a smaller-sized cable conduit (not shown). For example, the inner circumferential surface of middle flange 37 may be sized to slidably engage the outer circumferential surface of a nominal 1" (25 mm) PVC Schedule 40 cable conduit. Such 1" conduits are commonly used in the telecommunications industry. Cable from the cable conduit may be inserted into junction box 10 through a knocked-out portion of bottom aperture 30.

The slidable engagement between the inner surface of middle flange 37 and the outer surface of the cable conduit may provide a friction fit that helps to secure the cable conduit to middle flange 37. Middle flange 37 of bottom aperture 30 also comprises a partial slot 35 (FIGS. 5 and 14) that extends upwardly from the bottom rim of flange 37 partway through flange 37 toward bottom side 16 of junction box 10. When a cable conduit is slidably engaged to the inner circumferential surface of middle flange 37, fastening screw 34 may be inserted through screw-hole 32, outer flange 38 and partial slot 35 to bear against the outer surface of the cable conduit and to assist with securing the cable conduit to flange 37. Partial slot 35 may be implemented as a simple aperture (i.e. a screw hole).

Inner flange 36 is concentric with both outer flange 38 and middle flange 37 and has an outer circumferential surface sized to receive and slidably engage the inner circumferential surface of a smaller-sized cable conduit (not shown). For example, the outer circumferential surface of inner flange 36 may be sized to slidably engage the inner circumferential surface of a nominal ¾" (18 mm) PVC Schedule 40 cable conduit, which is widely used in the telecommunications industry. Cable from the cable conduit may be inserted into junction box 10 through a knocked-out portion of bottom aperture 30.

The slidable engagement between the outer surface of inner flange 36 and the inner surface of the cable conduit may provide a friction fit that helps to secure the cable conduit to inner flange 36. In addition, when a cable conduit is slidably engaged to the outer circumferential surface of inner flange 36, fastening screw 34 may be inserted through screw-hole 32, outer flange 38 and partial slot 35 in middle flange 37. In this manner, screw 34 may be made to bear against the outer surface of the cable conduit to assist with securing the cable conduit to the outer circumferential surface of inner flange 36.

As discussed above, conduits mounted to flanges 36, 37, 38 of bottom aperture 30 may be made of PVC or steel, as is common in the telecommunications industry. However, conduits made from almost, any material may be secured to flanges 36, 37, 38.

If the cable contained in a conduit is too thick to fit through inner knock-out section 33, then one or more additional knock-out sections may be removed from bottom aperture 30 to provide a larger aperture into junction box 10. For example, bottom aperture 30 may comprise a plurality of separate knock-out elements (not shown). A first, inner knock-out element (not shown) may be located interior to inner flange 36, such that when it is knocked out, all flanges 36, 37, 38 are still present on base member 24. A second, mid-sized knock-out element (not shown) may be located interior to middle flange 37, but exterior to inner flange 26. Such a mid-sized knock-out element may be attached to inner flange 36, such that when the mid-sized knock-out element is knocked out, inner flange 36 is removed from base member 24, forming a larger aperture into box 10. A third, large-sized knockout element (not shown) may be located interior to outer flange 38 and exterior to middle flange 37. Such a large-sized knock-out element may be attached to middle flange 37 (and possibly, to inner flange 36), such that when the large-sized knock-out element is knocked out, middle flange 37 (and possibly, inner flange 36) are removed from base member 24, forming an even larger aperture into box 10.

Figure 5:
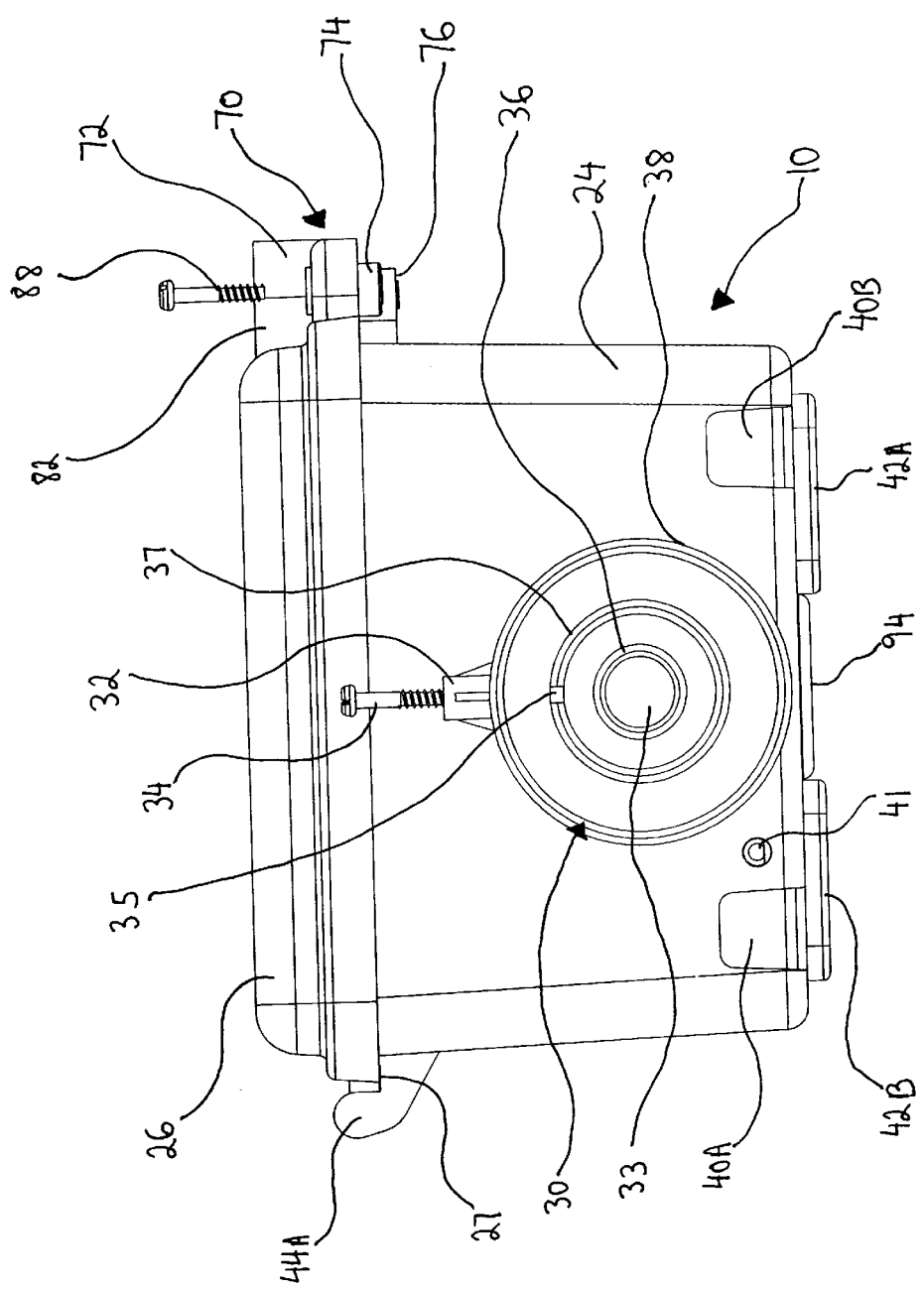
FIG. 5 is an elevated plan view of the bottom of the junction box of FIG. 1.
Figure 6:
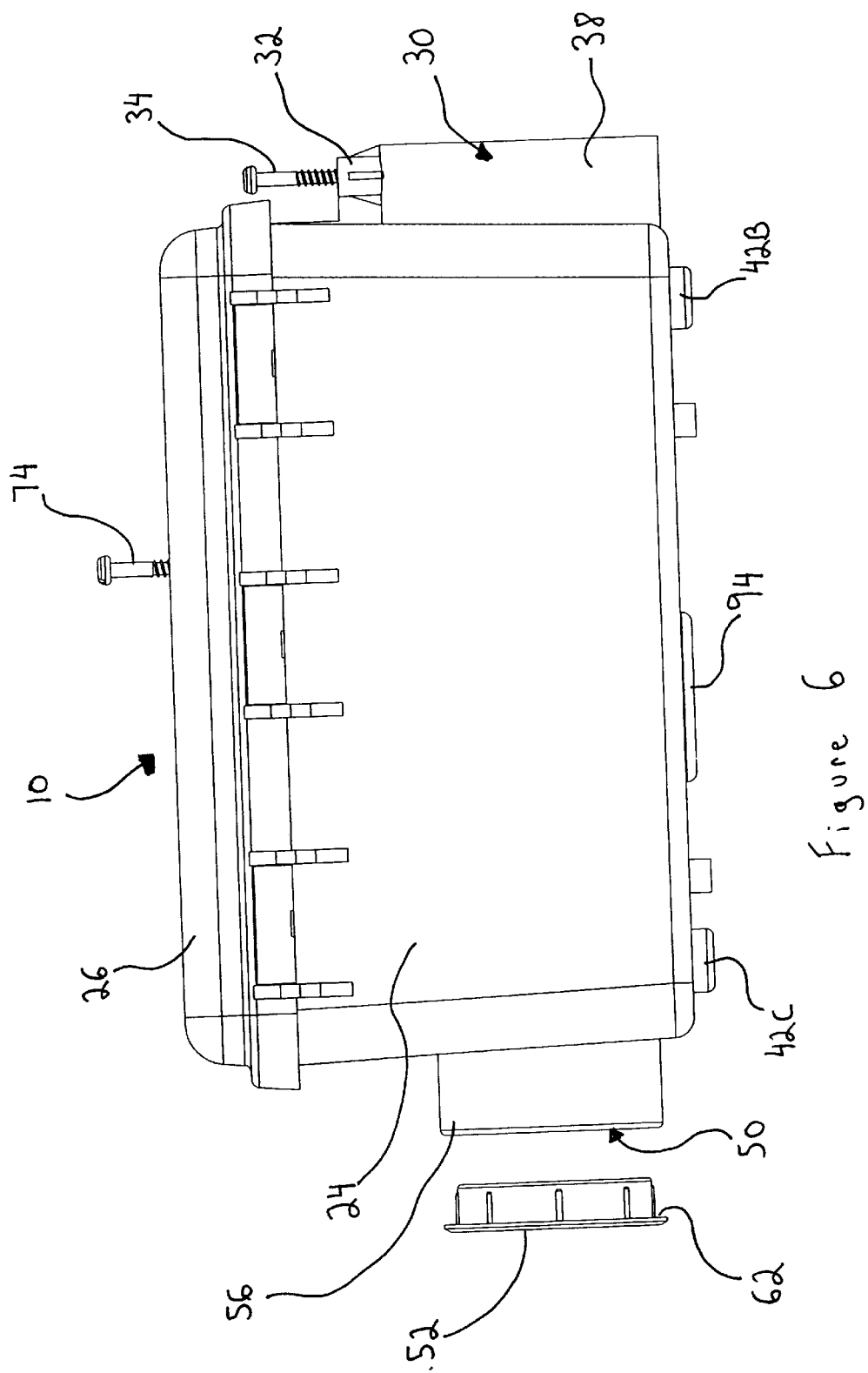
FIG. 6 is an elevated plan view of a hinged side of the junction box of FIG. 1.
Figure 7:
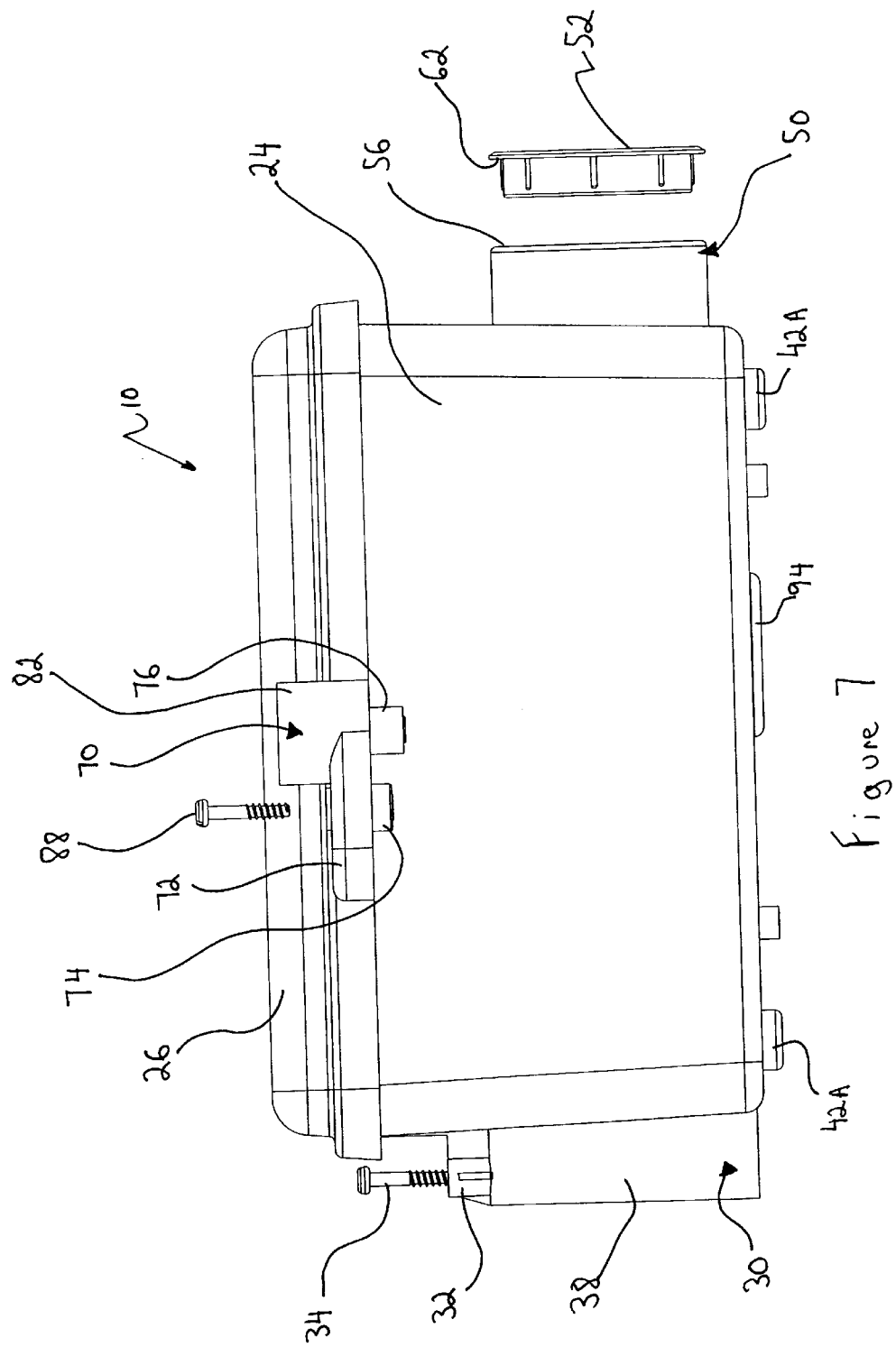
FIG. 7 is an elevated plan view of a clasp side of the junction box of FIG. 1.

In the illustrated embodiment, bottom side 16 of base member 24 also includes one or more additional knock-out apertures 40A, 40B (FIG. 5). When knocked-out, apertures 40 may be used to provide access to junction box 10 for additional cables and/or individual cables. Optionally, apertures 40 may be fitted with an elastomeric and waterproof grommet (not shown) to provide additional protection from water and moisture entering the interior of junction box 10. In the illustrated embodiment, bottom side 16 of base member 24 also includes an aperture 41 for the drainage of moisture. Aperture 41 may comprise one or more knockout elements. In addition, aperture 41 may be fabricated with a partially preformed aperture therein.

Hinged side 22 and clasp side 12 of base member 24 may have one or more additional knock-out side apertures 300, 302 (FIG. 8) for admitting additional cables and/or cable conduits into junction box 10. For example, knock-out side apertures 300, 302 may be sized to receive 1" (25 mm) cable conduits common in the telecommunications industry. Knock-out side apertures 300, 302 may generally be sized to fit conduits of various sizes. After either side knock-out aperture 300, 302 is removed, its rim may be fitted with an elastomeric and waterproof grommet (not shown) which prevents moisture from entering junction box 10.

Locking clasp assembly 70 may be used to secure junction box 10 in its closed configuration (FIGS. 1 through 7) by securing base member 24 to lid member 26 on clasp side 12 of junction box 10. Locking clasp assembly 70 may include a plurality of security measures which are useful to facilitate independent access to the interior of junction box 10 by two independent people/organizations and to prevent unwanted vandalism or tampering with the contents of junction box 10. Access for two different people/ organizations is useful, for example, to provide independent access to the service technicians of two different telecom (or other service) organizations technicians or to provide independent access to telecom (or other) service technicians and to telecom subscribers.

Figure 10:
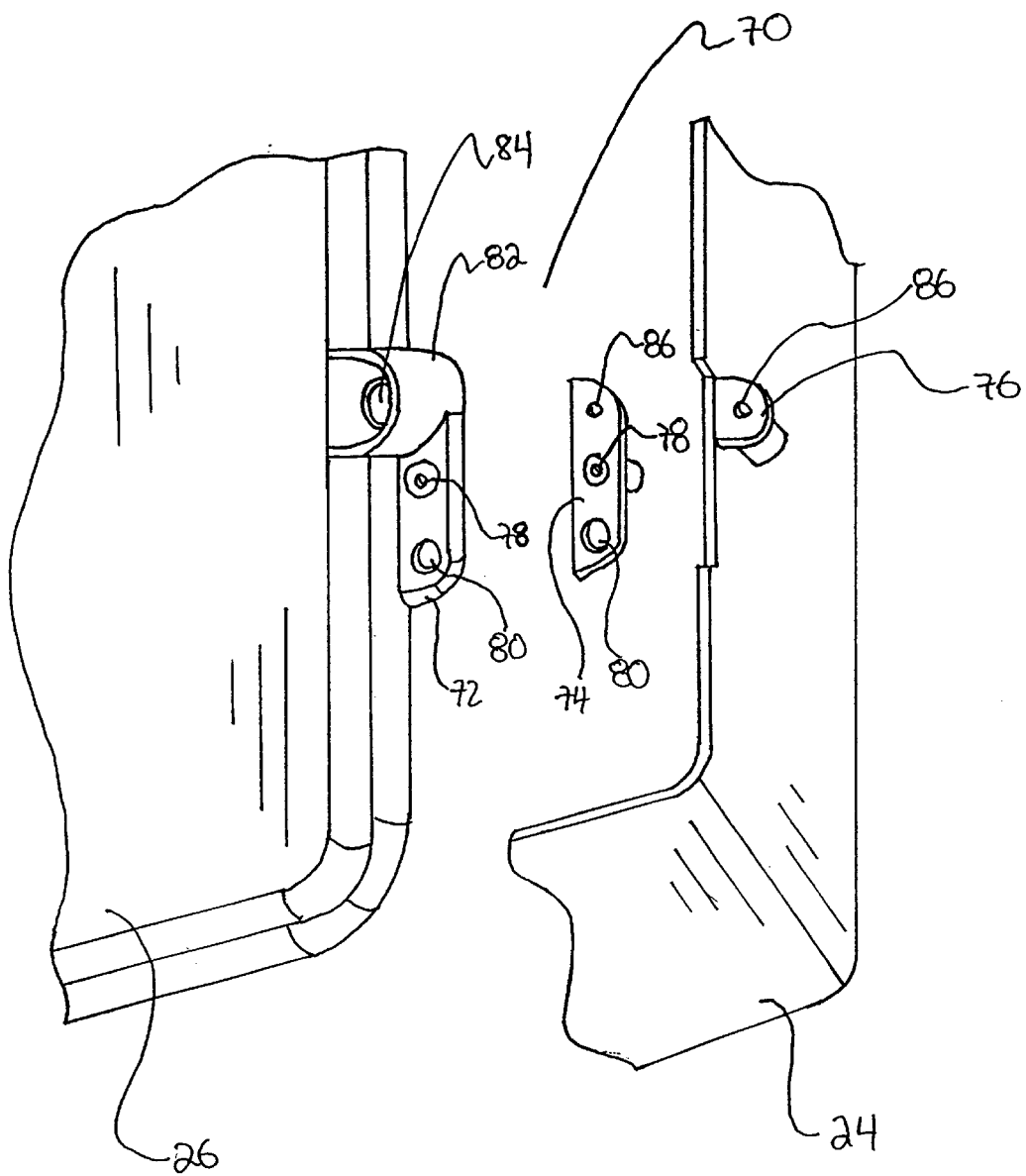
FIG. 10 is a partial isometric exploded view showing the clasp assembly of the junction box of FIG. 1.

The components and operation of locking clasp assembly 70 shown in FIG. 10. Locking clasp assembly 70 comprises: a lid flange 72, which extends outwardly from clasp side 12 of lid member 26; a base flange 76, which extends outwardly from clasp side 12 of base member 24; and an intermediate clasp member 74.

When junction box 10 is in its closed orientation, lid member 26 and base member 24 are brought together with intermediate clasp member 74 between the two. Intermediate clasp member 74 is fixed to base flange 76 by a locking screw 89 (FIG. 8), which screws from intermediate clasp member 74 into base flange 76 through a screw hole 86 (FIG. 3). Preferably, as shown in FIG. 8, locking screw 89 has a head that requires a special key or tool to operate. Service technicians from the telecommunications company (or other service organization that owns, maintains or operates the components inside junction box 10) may be provided with copies of the special key or tool, such that they are the only ones able to operate locking screw 89. Preferably, aperture 84 in lid flange 72 is sufficiently large to accommodate the head of locking screw 89, which protrudes through aperture 84 of lid flange 72, such that the head of locking screw 89 may be accessed with the proper key or tool. Hood extension 82 of lid flange 72 helps to prevent people from tampering with locking screw 89.

In addition to being mounted to base flange 76, intermediate clasp member 74 may be fixed to lid flange 72 by a conventional screw 88 (FIG. 1). Screw 88 extends from lid flange 72 into intermediate clasp member 74 through screw hole 78. Clasp assembly 70 maintains junction box 10 in its closed orientation, because locking screw 89 secures intermediate clasp member 74 to base flange 76 and conventional screw 88 secures intermediate clasp member 74 to lid flange 72.

In the closed orientation, a subscriber (or other user) may lock lid flange 72 to intermediate clasp member 74 by inserting a conventional key or combination padlock (not shown) through locking hole 80. The padlock prevents unauthorized entry into junction box 10, because it locks lid flange 72 to intermediate flange member 74. With locking screw 89 locking intermediate clasp member 74 to base flange 76, lid member 26 may not be separated from base member 24. When a subscriber (or other user) wants to access junction box 10, they simply unscrew conventional screw 88 from screw hole 78 and remove their padlock from hole 80, detaching lid flange 72 from intermediate flange member 74. In this manner, lid member 26 is allowed to swing away from base member 24, leaving intermediate clasp 74 attached to base flange 76 via locking screw 89.

A service technician (i.e. a second user) with the special key or tool required to operate the locking screw 89 may independently open junction box 10, even though a lock has been placed through hole 80. Using the special tool, the service technician may unscrew locking screw 89 through hole 84 in lid flange 72, such that intermediate clasp member 74 may be separated from base flange 76. In this manner, junction box 10 may be opened by separating lid member 26 from base member 24, leaving intermediate clasp 74 attached to lid flange 72 by screw 88 and the padlock inserted through hole 80.

The above described dual locking mechanism of clasp assembly 70 provides the advantage that junction box 10 is always locked and is secure from tampering. The dual opening mechanism of clasp assembly 70 is advantageous, because a first user (such as a subscriber) may independently access junction box 10. Such access to junction box 10 may allow a subscriber to perform simple maintenance or minor changes to the connections in junction box 10 without requiring the presence of a service technician. The dual opening mechanism of clasp assembly 70 has the additional advantage that a service technician, may also independently access junction box 10 without requiring the subscriber to remove their lock from hole 80. The service technician may then make more substantial changes or repairs to the connections and/or other components contained in junction box 10. The dual independent access clasp assembly 70 may also permit dual independent access to technicians from two of more different service providing organizations, such as a telecom company and a cable company, for example.

As depicted in FIG. 8, a terminal connector platform 204 may be mounted to the inner surface 250 of lid member 26 by fasteners 206. Fasteners 206 may be screws which screw into screw holes (not shown) formed integrally on inner surface 250 of lid member 26.

Figure 11:
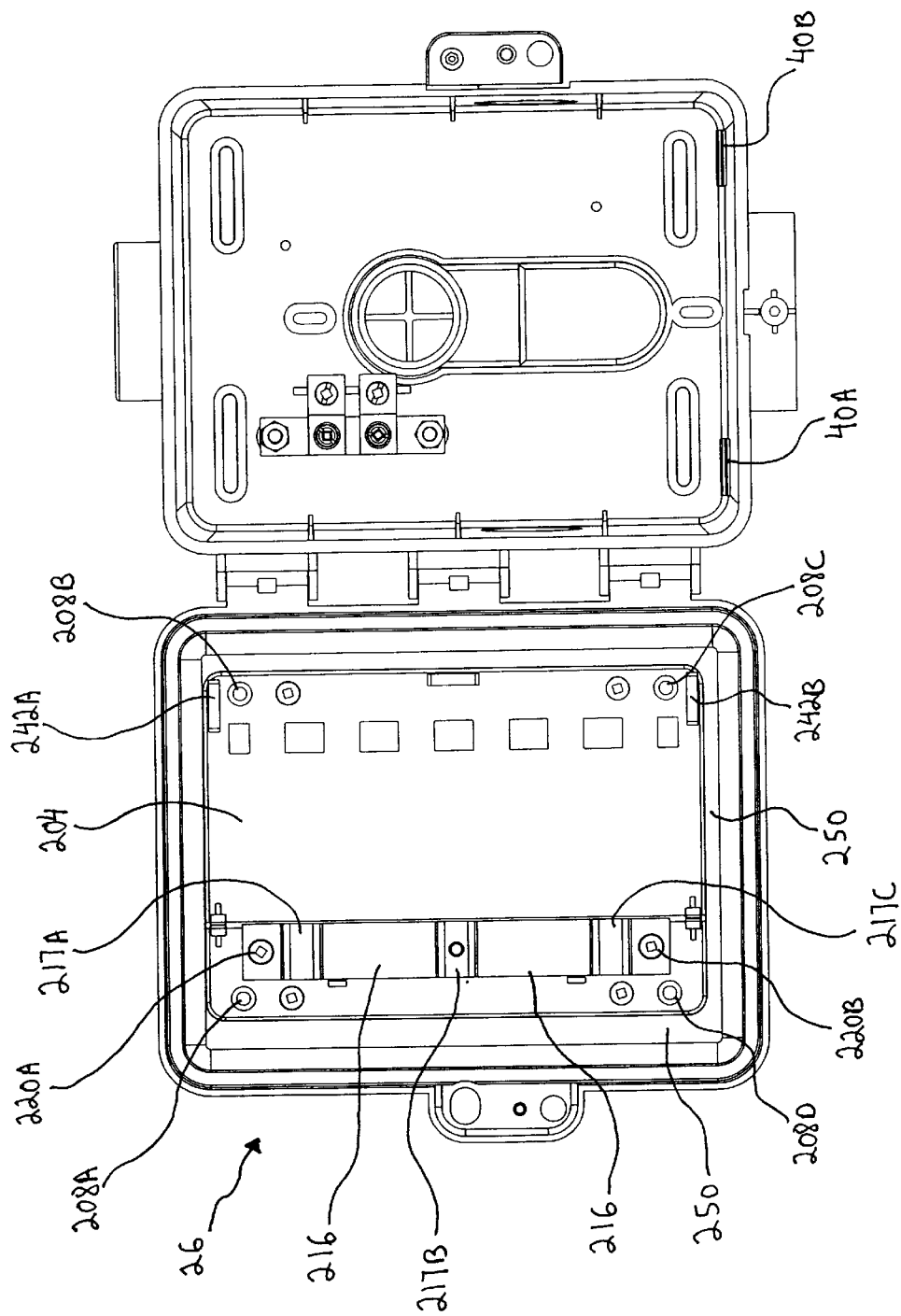
FIG. 11 is an elevated plan view of the junction box of FIG. 8 housing a first type of grounding bar.

Junction box 10 may house various types of terminal connectors and/or other electrical components, which may be mounted on platform 204 or directly on inner surface 250 of lid member 26. In the illustrated embodiment of FIG. 8, terminal connector platform 204 comprises a number of features designed to accommodate various types of terminal connectors or other components, which may be mounted thereon. These features are shown in FIGS. 11 and 12, which depict a first type of grounding bar 216 and a first type of terminal connector 200, and to FIGS. 13 and 14, which depict a second type of grounding bar 230 and a second type of terminal connector 202. Typically (although not necessarily), terminal connectors, such as terminal connectors 200, 202, are provided by the telecommunications company or other service providing organization that owns and/or maintains junction box 10 and/or operates the services requiring junction box 10.

As shown in FIG. 8, platform 204 may comprise a plurality of apertures 208, which may be used for mounting various types of terminal connectors and/or other electrical components (not shown) to lid member 26 of junction box 10. Apertures 208 may also be used as additional or alternative mounting apertures through which fasteners (not shown) may extend to mount platform 204 to inner surface 250 of lid member 26.

Platform 204 may also comprise a plurality of tie strap brackets 242, which may be used (in conjunction with tie straps) to restrain cables on the inside of junction box 10. Preferably, tie strap brackets 242 are positioned at spaced apart locations on platform 204.

Preferably, platform 204 comprises a screw hole 214, which is surrounded by a stand-off flange 212 that projects inwardly from platform 204 (FIG. 8). Screw hole 214 and stand-off flange 212 may be used to mount and support different types of grounding bars. Such grounding bars may provide a common ground connection to terminal connectors housed in junction box 10.

FIG. 11 depicts a first type of grounding bar 216 which is used in conjunction with terminal connectors 200 of FIG. 12. Referring to FIGS. 8 and 11, elevated section 217B of grounding bar 216 extends inwardly from the base of grounding bar 216 to fit over stand-off flange 212 and is mounted to stand-off flange 212 by a threaded fastener (not shown) inserted into screw hole 214. Grounding bar 216 is also mounted to platform 204 by fasteners 220, which screw respectively into screw holes 210 of platform 204.

As shown in FIGS. 11 and 12, grounding bar 216 comprises three elevated sections 217A, 217B, 217C, which extend inwardly from the base of grounding bar 216. Terminal connectors 200 may be grounded and fastened to elevated sections 217 of grounding bar 216. Terminal connectors 200 may comprise metallic mounting/grounding brackets 222, each of which may be fastened to an associated one of elevated sections 217 by fasteners (not shown). Such fasteners may comprise conventional metallic threaded studs and nuts. Additionally or alternatively, such fasteners may support other types of electrical connectors, such as tab connectors, screw connectors, crimp connectors and the like. Any type of electrical connector capable of connecting to the fasteners or connecting directly to grounding bar 216 may be used.

In operation, telecommunications cables entering junction box 10 may be connected to one another by connecting their ground wires to the common grounding bar 216 and by connecting their respective signal wires to connectors 224, 226 on either side of a terminal connector 200. In the illustrated embodiment, connectors 224, 226 are screw type connectors. In general, connectors 224, 226 may be any type of electrical connector.

The location of terminal connectors 200 on lid member 26 of junction box 10 facilitates easy connection and changing of connections. When junction box 10 is opened terminal connectors 200 and their connectors 224, 226 stand out from inner surface 250 of lid member 26 rather than being recessed on the inside of base member 24. When junction box 10 is closed, terminal connectors 200 are housed in the relatively deep recess of base member 24.

Figure 13:
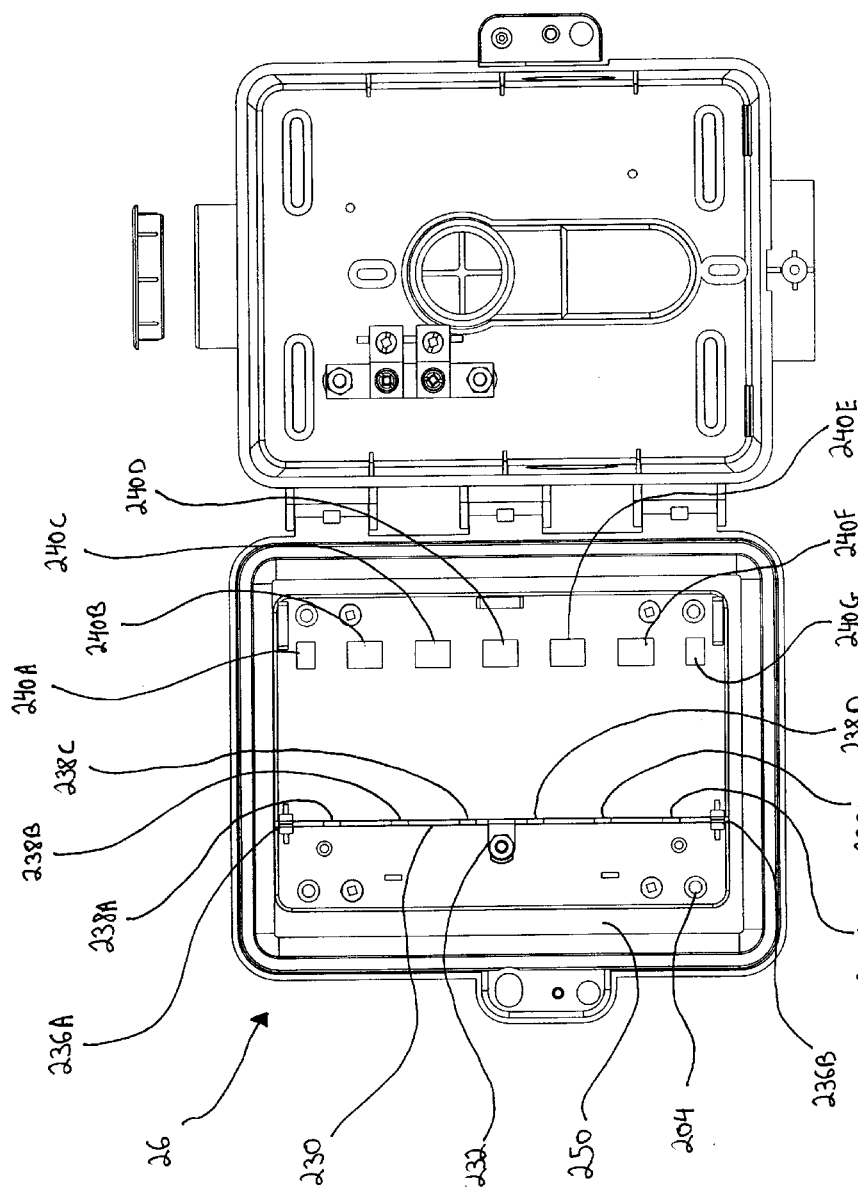
FIG. 13 is an elevated plan view of the junction box of FIG. 8 housing a second type of grounding bar.

FIG. 13 depicts a second type of grounding bar 230, which is used in conjunction with the terminal connectors 202 of FIG. 14. Referring to FIGS. 8, 13 and 14, platform 204 may comprise a slot 234 and a pair of brackets 236 located at either end of slot 234. Grounding bar 230 may be inserted into slot 234 in an orientation that is substantially orthogonal to platform 204 and each end of grounding bar 230 may be inserted through a corresponding one of brackets 236. In this manner, slot 234 and brackets 236 help to secure grounding bar 230 in place on platform 204. Transversely extending tab 232 of grounding bar 230 extends over and is mounted to stand-off flange 212 by a fastener (not shown), which may be threadably inserted into screw hole 214.

As shown in FIGS. 13 and 14, grounding bar 230 comprises a plurality of inwardly projecting members 238, one of which corresponds with each terminal connector 202. Although the number of terminal connectors 202 and inwardly projecting members 238 may vary, the illustrated embodiment depicts six terminal connectors 202. Each of terminal connectors 202 has a grounding hood (not shown) on a first end thereof. The grounding hood of each terminal connector 202 fits slidably over a corresponding one of inwardly projecting members 238 to form a friction fit with the inwardly projecting member 238. The friction fit between inwardly projecting members 238 and the grounding hood of terminal connectors 202 establishes the ground connection for terminal connectors 202 and assists in mounting the first end of terminal connectors 202 to platform 204. As best seen in FIG. 8, platform 204 may comprise a plurality of apertures 240. Apertures 240 may be sized, positioned and shaped, such that specially designed legs (not shown) on a second end of terminal connectors 202 may project through apertures 240 and extend under platform 204 to secure the second end of terminal connectors 202 to lid member 26.

Each of terminal connectors 202 comprises two specialized connectors 242, 244 which may be specifically designed to receive the signal carrying wires of conventional telecommunications cables (not shown). In operation, telecommunications cables entering junction box 10 may be connected to one another by connecting their ground wires to the common grounding bar 216 and by connecting their respective signal carrying wires to specialized connectors 242, 244.

The location of terminal connectors 202 on lid member 26 of junction box 10 facilitates easy connection and changing of connections When junction box 10 is opened, terminal connectors 202 and their connectors 242, 244 stand out from inner surface 250 of lid member 26 rather than being recessed on the inside of base member 24. When junction box 10 is closed, terminal connectors 202 are housed in the relatively deep recess of base member 24.

FIGS. 15–22 depict a junction box 10' according to an alternative embodiment of the invention. Junction box 10' is substantially similar to junction box 10 of FIGS. 1–14, except that junction box 10' is designed to be mounted in the interior of a wall. Typically, although not necessarily, junction box 10' is mounted to the interior of a wall during the wall's fabrication. As junction box 10' is similar to junction box 10, the features of junction box 10' are depicted and referred to in this description using the same reference numerals as the similar features of junction box 10 followed by a "prime" symbol (').

Figure 20:
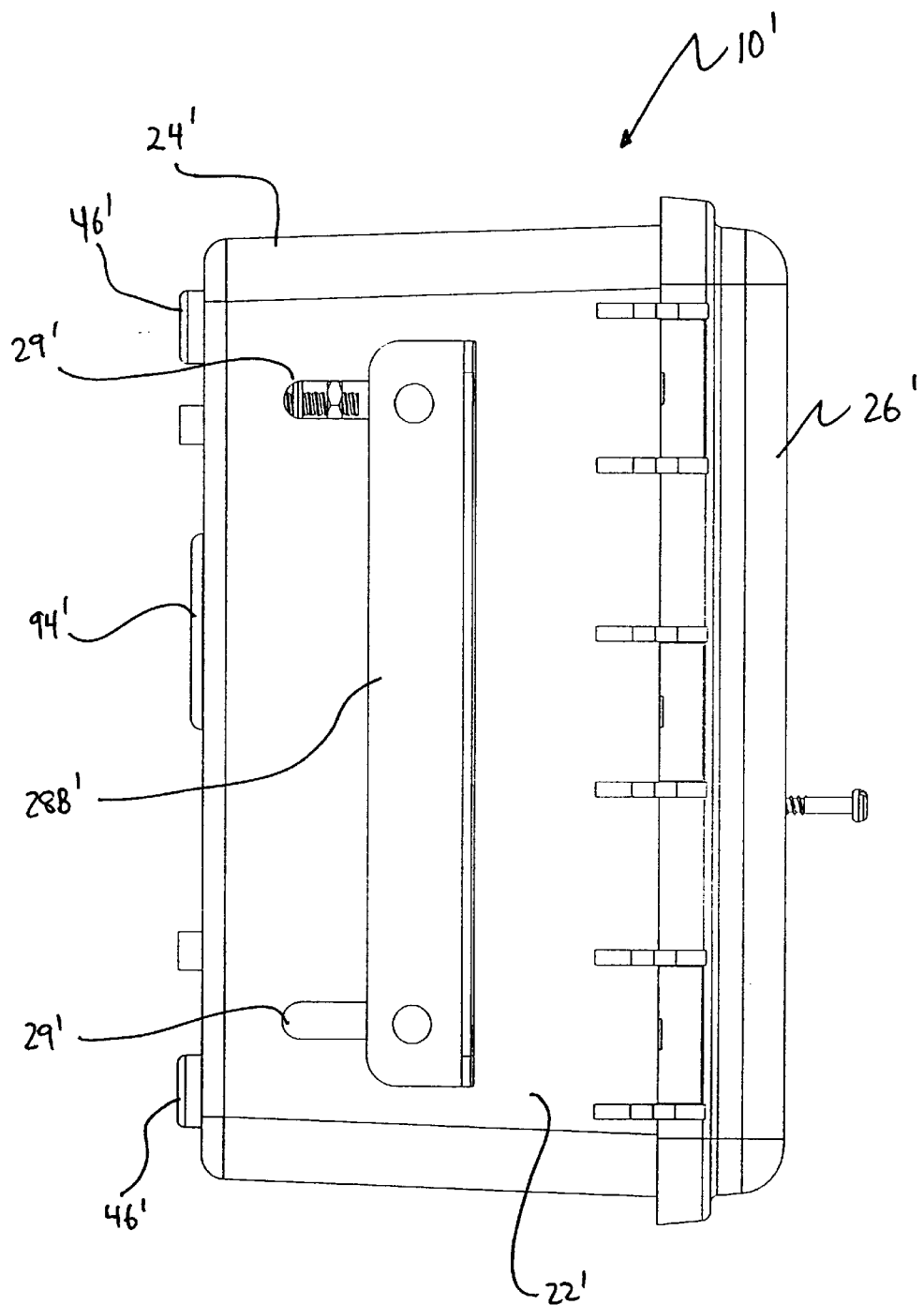
FIG. 20 is an elevated plan view of a hinged side of the junction box of FIG. 15.
Figure 21:
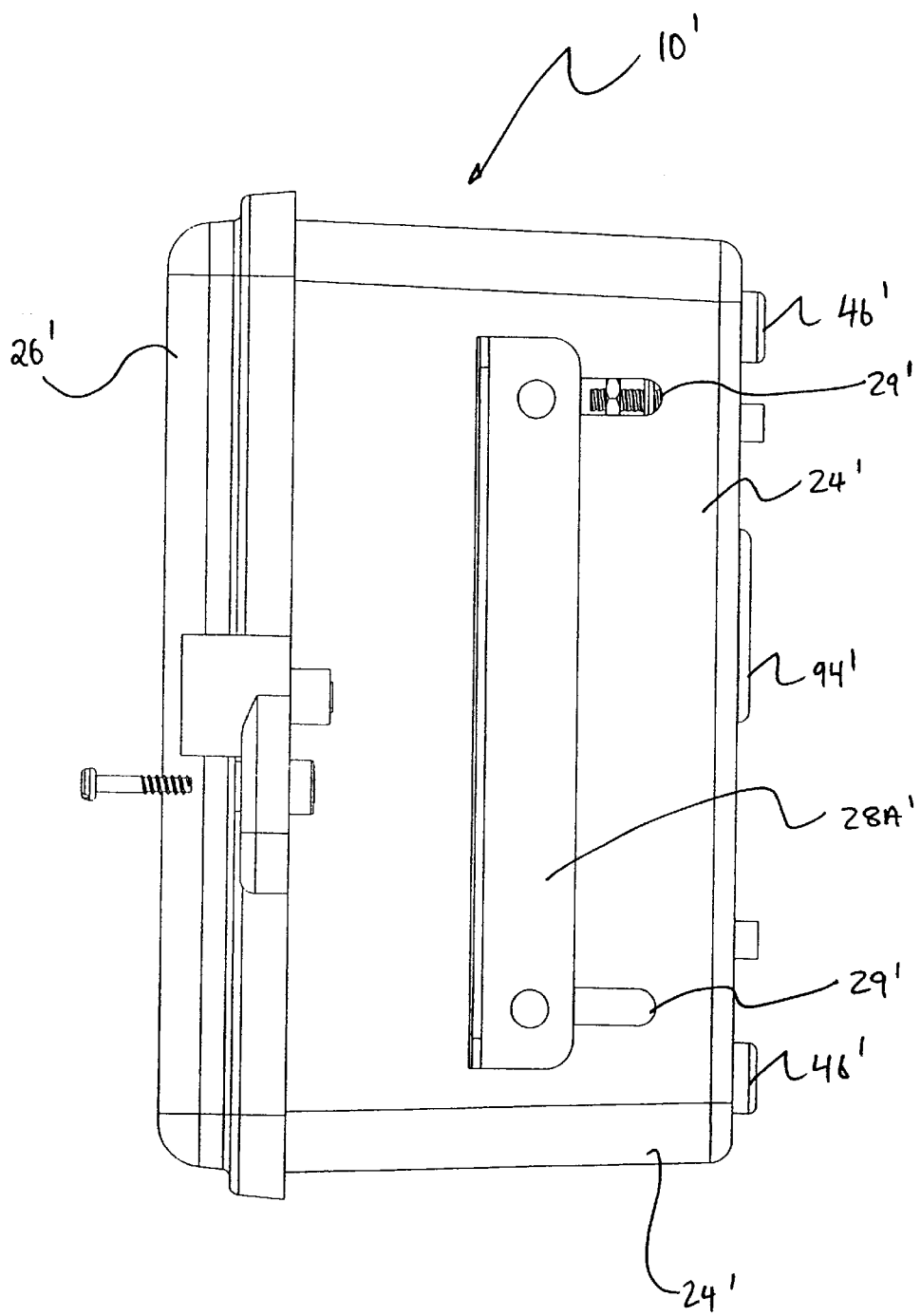
FIG. 21 is an elevated plan view of a clasp side of the junction box of FIG. 15; and, FIG. 22 is an elevated plan view of the junction box of FIG. 15 in an open configuration.
Figure 22:
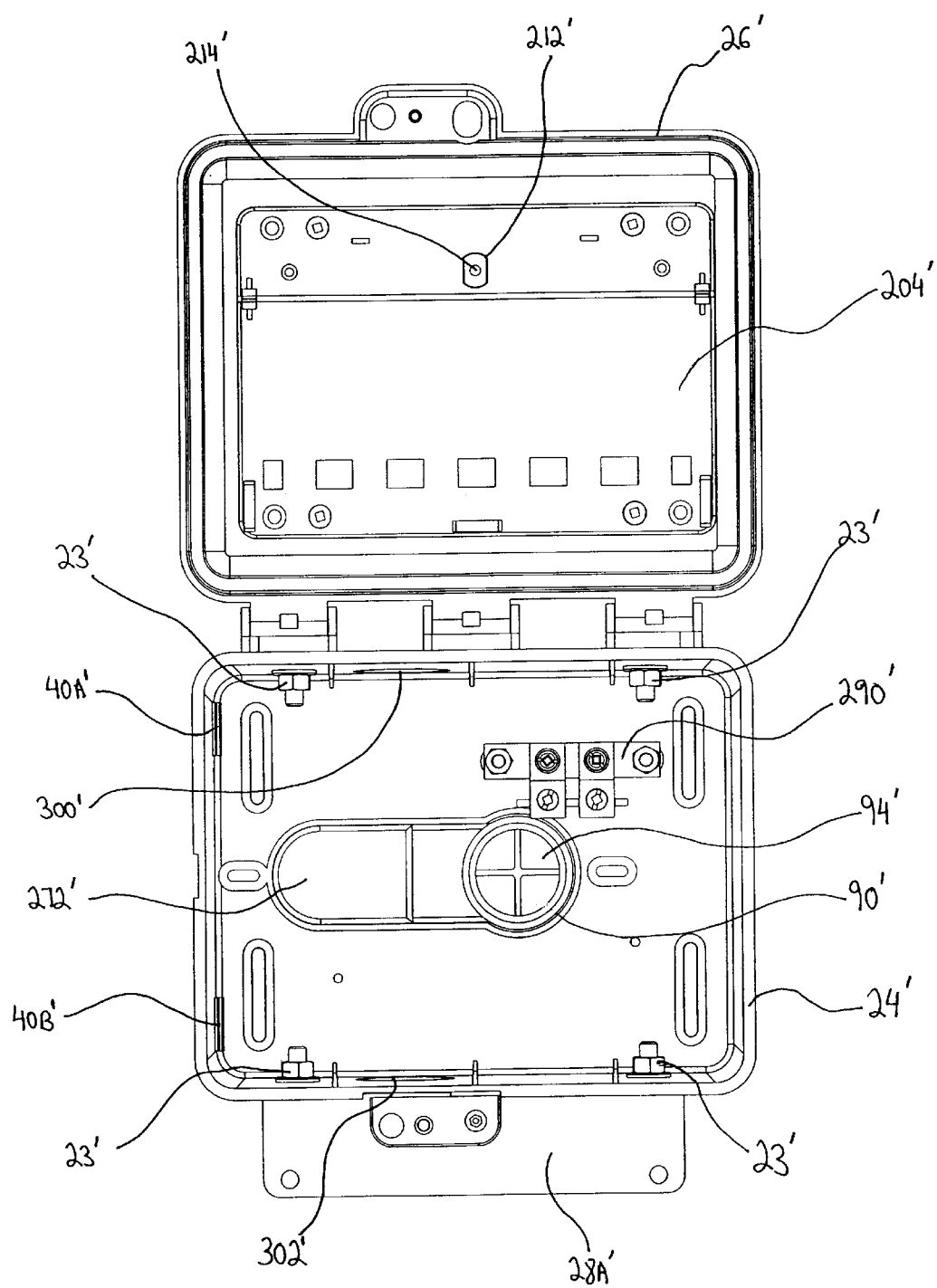

Using fasteners 23', a pair of flanges 28A', 28B' (collectively, 28') are mounted to junction box 10' on its clasp side 12' and hinge side 22'. Although fasteners 23' are depicted as nuts and bolts, any suitable fasteners may be used to mount flanges 28' to junction box 10'. Junction box 10' includes a pair of holes 29' on each of clasp side 12' and hinge side 22'. Fasteners 23' extend through flanges 28' and holes 29' to mount flanges 28' to junction box 10'. As shown in FIGS. 20 and 21, holes 29' may be elongated to provide positional adjustability for flanges 28'.

Flanges 28' are provided for mounting junction box 10' to the framework of a wall, such that at least a portion of base member 24' extends towards the interior of the wall. A variety of mounting schemes are possible. For example, flanges 28' may be fastened to the wooden or metal studs of a wall. Junction box 10' may be oriented such that lid member 26' opens towards the exterior of a building or lid member 26' opens towards the interior of a building. Flanges 28' may be made of metal or other suitable materials.

Junction box 10' comprises a top aperture 50', a bottom aperture 30', a back aperture 90', an elongated back aperture 272' and a pair of side apertures 300', 302'. Preferably, these apertures are knock-out apertures and are substantially similar to the corresponding knock-out apertures of junction box 10 described above. Each of these apertures may also comprise a plurality of knock-out elements, such that a variety of sizes of apertures may be formed. In the illustrated embodiment, upper aperture 50' and lower aperture 30' do not have concentric flanges 56, 58 and 36, 37, 38, which respectively surround upper aperture 50 and lower aperture 30 of junction box 10. However, in alternative embodiments, upper aperture 50' and lower aperture 30' may be constructed with such concentric flanges.

The interior of junction box 10' (FIG. 22) may be substantially similar to and include substantially similar features as the interior of junction box 10 (FIGS. 8, 11–14).

As will be apparent to those skilled in the art in the light of the foregoing disclosure, many alterations and modifications are possible in the practice of this invention without departing from the spirit or scope thereof. For example;

Terminal connector platform 204 is not required by the invention. The features of platform 204, such as stand-off flange 212, screw hole 214 and apertures 240 for example, may be formed integrally on inner surface 250 of lid member 26.

The illustrated terminal connectors 200, 202 of FIGS. 12 and 14 comprise surge protection modules commonly used in the telecommunications industry. However, those skilled in the art will appreciate that many variations of terminal connectors could be mounted to platform 204 or mounted directly on inner surface 250 of lid member 26. In general, the specific terminal connectors used inside junction box 10 may be varied without departing from the invention. The invention should be understood to accommodate any type of suitable terminal connector that may be mounted on a terminal connector platform or directly on inner surface 250 of lid member 26.

In addition to terminal connectors, various other types of electrical components may be housed in junction box 10. Such other components may include, for example: capacitors, switches, relays, ADSL splitters, HDSL splitters, circuit boards, amplifiers, cable splitters and routers.

If junction box 10 houses different types of terminal connectors (i.e. terminal connectors different from terminal connectors 200, 202 of FIGS. 13 and 14) or other electrical components, junction box 10 may require a modified platform 204. Those skilled in the art will appreciate that there are many implementations of platform 204, which may be employed to house alternative or additional terminal connectors or electrical components.

Locking clasp assembly represents a preferred embodiment of how base flange 76 and lid flange 72 may both be independently locked to, and unlocked from, intermediate clasp member 74. other embodiments are possible. For example, locking screw 89 may be replaced by a conventional screw having a locking pin that may be inserted through its tip to lock intermediate clasp member 74 to base flange 76.

Although junction box 10 has been depicted and described as having a dual-locking clasp assembly 70, dual locking clasp assembly 70 is not necessary. Junction box 10 may include a conventional single locking clasp or a non-locking clasp.

Similar alterations and modifications as those discussed above may be made to junction box 10' and its components.

Accordingly, the scope of the invention is to be construed in accordance with the substance defined by the following claims.

What is claimed is:

1. A junction box comprising:

a base member having a recessed region therein;

a plurality of concentric lower flanges extending from a lower surface of the base member, wherein a first cable conduit may be slidably engaged to one of the plurality of lower flanges;

a plurality of concentric upper flanges extending from a upper surface of the base member, wherein a second cable conduit may be slidably enagaged to one of the plurality of upper flanges;

one or more upper knock-out elements located on the upper surface of the base member inside a diameter of an outermost one of the plurality of concentric upper flanges, the one or more upper knock-out elements being removable from the base member to form an upper aperture therein, such that a cable may extend from an interior of the second cable conduit through the upper aperture and into the enclosure; and a lid member positionable over the recessed region of the base member to form an enclosure, the lid member and base member coupleable on one side by one or more hinges and on a side opposite the one or more hinges by a clasp assembly, the clasp assembly comprising:

a base clasp flange extending outwardly from the base member;

a lid clasp flange extending outwardly from the lid member; and an intermediate clasp member, wherein the base and lid clasp flanges may both be independently locked to, and unlocked from, the intermediate clasp member.

2. A junction box according to claim 1 comprising one or more lower knock-out elements located on the lower surface of the base member inside a diameter of an outermost one of the plurality of concentric lower flanges, the one or more lower knock-out elements being removable from the base member to form a lower aperture therein, such that a cable may extend from an interior of the first cable conduit through the lower aperture and into the enclosure.

3. A junction box according to claim 1 comprising a lower aperture located on the lower surface of the base member inside a diameter of the innermost one of the plurality of concentric lower flanges, such that a cable may extend from an interior of the first cable conduit through the lower aperture and into the enclosure.

4. A junction box according to claim 3 comprising an elastomeric plug sized and shaped to fill the lower aperture when the lower aperture is not in use.

5. A junction box according to claim 1 comprising a first back knock-out element located on a recessed surface of the base member, the first back knock-out element being removable from the base member to form a first back aperture therein, such that a cable may extend through the first back aperture and into the enclosure.

6. A junction box according to claim 1 comprising a first back aperture located on a recessed surface of the base member, such that a cable may extend through the first back aperture and into the enclosure.

7. A junction box according to claim 6 comprising an elastomeric plug sized and shaped to fill the first back aperture when the first back aperture is not in use.

8. A junction box according to claim 6 comprising an elongated knock-out element contiguous with the first back aperture on the recessed surface of the base member, the elongated knock-out element being removable from the base member to form an elongated first back aperture.

9. A junction box according to claim 8, wherein the elongated knock-out element comprises a plurality of smaller knock-out elements, each of which is independently removable from the base member.

10. A junction box according to claim 8 comprising a pair of knock-out screw holes, located on the recessed surface of the base member on opposing sides of the elongated first back aperture, the screw holes operative to receive fasteners, such that a cable adapter may be mounted to the base member.

11. A junction box according to claim 1, wherein the plurality of concentric upper flanges comprises an innermost upper flange and an outermost upper flange.

12. A junction box according to claim 11, wherein the outermost upper flange comprises an outer circumferential surface, the outer circumferential surface sized such that an inner circumferential surface of a first sized cable conduit may be slidably engaged to the outer circumferential surface.

13. A junction box according to claim 12, wherein the first sized cable conduit is a nominal 2" cable conduit.

14. A junction box according to claim 11, wherein the innermost upper flange comprises an outer circumferential surface, the outer circumferential surface sized such that an inner circumferential surface of a second sized cable conduit may be slidably engaged to the outer circumferential surface.

15. A junction box according to claim 14, wherein the second sized cable conduit is a nominal 1¼" cable conduit.

16. A junction box according to claim 11, wherein the outermost upper flange comprises a slot that extends from the upper surface of the base member through the outermost upper flange.

17. A junction box according to claim 1, wherein the plurality of concentric lower flanges comprises an innermost lower flange, an intermediate lower flange and an outermost lower flange.

18. A junction box according to claim 17, wherein the outermost lower flange comprises an outer screw hole extending radially through the outermost lower flange and the intermediate lower flange comprises an intermediate screw hole radially aligned with the outer screw hole.

19. A junction box according to claim 18, wherein the outermost lower flange comprises an inner circumferential surface, the inner circumferential surface sized such that an outer circumferential surface of a first sized cable conduit may be slidably engaged to the inner circumferential surface and wherein a screw may be inserted through the outer screw hole to bear against the outer circumferential surface of the cable conduit.

20. A junction box according to claim 19, wherein the first sized cable conduit is a nominal 2" cable conduit.

21. A junction box according to claim 18, wherein the intermediate lower flange comprises an inner circumferential surface, the inner circumferential surface sized such that an outer circumferential surface of a second sized cable conduit may be slidably engaged to the inner circumferential surface and wherein a screw may be inserted through the outer hole and the intermediate screw hole to bear against the outer circumferential surface of the cable conduit.

22. A junction box according to claim 21, wherein the second sized cable conduit is a nominal 1" cable conduit.

23. A junction box according to claim 18, wherein the innermost lower flange comprises an outer circumferential surface, the outer circumferential surface sized such that an inner circumferential surface of a third sized cable conduit may be slidably engaged to the outer circumferential surface and wherein a screw may be inserted through the outer screw hole and the intermediate screw hole to bear against an outer circumferential surface of the cable conduit.

24. A junction box according to claim 23, wherein the third sized cable conduit is a nominal ¾" cable conduit.

25. A junction box according to claim 1 comprising a first side knock-out element located on a first side of the base member, the first side knock-out element being removable from the base member to form a first side aperture therein, such that a cable may extend through the first side aperture and into the enclosure.

26. A junction box according to claim 25 comprising a second side knock-out element located on a second side of the base member opposite the first side of the base member, the second side knock-out element being removable from the base member to form a second side aperture therein, such that a cable may extend through the second side aperture and into the enclosure.

27. A junction box according to claim 2, wherein the one or more lower knock-out elements comprise an inner knock-out element located inside a diameter of an innermost one of the plurality of concentric lower flanges.

28. A junction box according to claim 27, wherein the one or more lower knock-out elements comprise a second knock-out element located inside the diameter of a second one of the plurality of concentric lower flanges, the innermost one of the plurality of concentric lower flanges being attached to the second knock-out element and removable therewith.

29. A junction box according to claim 28, wherein the one or more lower knock-out elements comprise a third knock-out element located outside the diameter of the second one of the plurality of concentric lower flanges and inside the diameter of the outermost one of the plurality of concentric lower flanges, the second one of the plurality of concentric lower flanges being attached to the third knock-out element and removable therewith.

30. A junction box according to claim 1 comprising a pair of side flanges, one of which is mounted to either side of the base member, each of the pair of side flanges comprising an angled member which extends outwardly from the side of the base member.

31. A junction box according to claim 1, wherein a mounting position of side flanges on the base member is adjustable, such that the side flanges may be moved closer to or further from the lid member.

32. A junction box according to claim 31, wherein the side flanges are secured to the interior framework of a vertical wall.

33. A junction box according to claim 30, wherein the pair of side flanges are made of metal.

34. A junction box comprising:
a base member having a recessed region therein;
a lid member positionable over the recessed region of the base member to form an enclosure, the lid member and base member coupleable on one side by one or more hinges;
a plurality of concentric lower flanges extending from a lower surface of the base member, wherein a first cable conduit may be slidably engaged to one of the plurality of lower flanges;
a plurality of concentric upper flanges extending from an upper surface of the base member; and
one or more upper knock-out elements located on the upper surface of the base member inside a diameter of the outermost one of the plurality of concentric upper flanges, the one or more upper knock-out elements being removable from the base member to form an upper aperture therein, such that a cable may extend from an interior of a second cable conduit through the upper aperture and into the enclosure, wherein the plurality of concentric upper flanges comprises an innermost upper flange and an outermost upper flange, the outermost upper flange comprising a first outer circumferential surface, the first outer circumferential surface sized such that an inner circumferential surface of a first sized cable conduit may be slidably engaged to the first outer circumferential surface and the innermost upper flange comprising a second outer circumferential surface, the second outer circumferential surface sized such that an inner circumferential surface of a second sized cable conduit may be slidably engaged to the second outer circumferential surface.

35. A junction box comprising:
a base member having a recessed region therein;
a lid member positionable over the recessed region of the base member to form an enclosure, the lid member and base member coupleable on one side by one or more hinges;
a plurality of concentric lower flanges extending from a lower surface of the base member;
a plurality of concentric upper flanges extending from an upper surface of the base member, wherein an upper cable conduit may be slidably engaged to one of the plurality of upper flanges; and
one or more upper knock-out elements located on the upper surface of the base member inside a diameter of the outermost one of the plurality of concentric upper flanges, the one or more upper knock-out elements being removable from the base member to form an upper aperture therein, such that a cable may extend from an interior of the upper cable conduit through the upper aperture and into the enclosure, wherein the plurality of concentric lower flanges comprises an outermost lower flange having an outer screw bole extending radially through the outermost lower flange, an intermediate lower flange having an intermediate screw hole radially aligned with the outer screw hole, and an innermost lower flange,
the outermost lower flange comprising a first inner circumferential surface, the first inner circumferential surface sized such that an outer circumferential surface of a first sized cable conduit may be slidably engaged to the first inner circumferential surface and wherein a screw may be inserted through the outer screw hole to bear against the outer circumferential surface of the first sized cable conduit,
the intermediate lower flange comprising a second inner circumferential surface, the second inner circumferential surface sized such that an outer circumferential surface of a second sized cable conduit may be slidably engaged to the second inner circumferential surface and wherein a screw may be inserted through the outer screw hole and the inetermediate screw hole to bear against the outer circumferential surface of the second sized cable conduit, and
the innermost lower flange comprising an outer circumferential surface, the outer circumferential surface sized such that an inner circumferential surface of a third sized cable conduit may be slidably engaged to the outer circumferential surface and wherein a screw may be inserted through the outer screw hole and the intermediate screw hole to bear against an outer circumferential surface of the third sized cable conduit.

36. A junction box comprising:
a base member having a recessed region therein;
a lid member positionable over the recessed region of the base member to form an enclosure, the lid member and base member coupleable on one side by one or more hinges and on a side opposite the one or more hinges by a clasp assembly, the clasp assembly comprising:
a base clasp flange extending outwardly from the base member;
a lid clasp flange extending outwardly from the lid member; and
an intermediate clasp member, wherein the base and lid clasp flanges may both be independently locked to, and unlocked from, the intermediate clasp member;

a plurality of concentric lower flanges extending from a lower surface of the base member, wherein a first cable conduit may be slidably engaged to one of the plurality of lower flanges;

a plurality of concentric upper flanges extending from an upper surface of the base member, wherein a second cable conduit may be slidably engaged to one of the plurality of upper flanges;

one or more upper knock-out elements located on the upper surface of the base member inside a diameter of the outermost one of the plurality of concentric upper flanges, the one or more knock-out elements being removable from the base member to form an upper aperture therein, such that a cable may extend from an interior of the second cable conduit through the upper aperture and into the enclosure;

a first back aperture located on a recessed surface of the base member, such that a cable may extend through first back aperture and into the enclosure; and an elongated knock-out element contiguous with the first back aperture on the recessed surface of the base member, the extended knock-out element being removable from the base member to form an elongated the first back aperture.

37. A junction box comprising:

a base member having a recessed region therein;

a lid member positionable over the recessed region of the base member to form an enclosure, the lid member and base member coupleable on one side by one or more hinges;

a plurality of concentric lower flanges extending from a lower surface of the base member, wherein a first cable conduit may be slidably engaged to one of the plurality of lower flanges;

a plurality of concentric upper flanges extending from an upper surface of the base member, wherein a second cable conduit may be slidably engaged to one of the plurality of upper flanges;

one or more upper knock-out elements located on the upper surface of the base member inside a diameter of the outermost one of the plurality of concentric upper flanges, the one or more upper knock-out elements being removable from the base member to form an upper aperture therein, such that a cable may extend from an interior of the second cable conduit through the upper aperture and into the enclosure;

a first back aperture located on a recessed surface of the base member, such that a cable may extend through the first back aperture and into the enclosure; and an elongated knock-out element contiguous with the first back aperture on the recessed surface of the base member, the extended knock-out element being removable from the base member to form an elongated first back aperture.

38. A junction box comprising:

a base member having a recessed region therein; and a lid member positionable over the recessed region of the base member to form an enclosure, the lid member and base member coupleable on one side by one or more hinges;

a plurality of concentric lower flanges extending from a lower surface of the base member, wherein a first cable conduit may be slidably engaged to one of the plurality of lower flanges;

a plurality of concentric upper flanges extending from an upper surface of the base member, wherein a second cable conduit may be slidably engaged to one of the plurality of upper flanges; and one or more upper knock-out elements located on the upper surface of the base member inside a diameter of the outermost one of the plurality of concentric upper flanges, the one or more upper knock-out elements being removable from the base member to form an upper aperture therein, such that a cable may extend from an interior of the second cable conduit through the upper aperture and into the enclosure.

39. A junction box comprising:

a base member;

a lid member positionable over the base member to form an enclosure;

a plurality of nested first flanges extending from a first surface of the base member;

one or more first knock-out elements located on the first surface of the base member inside a diameter of an outermost one of the plurality of nested first flanges, the one or more first knock-out elements being removable from the base member to form a first aperture therein.

40. A junction box according to claim 39 comprising one or more second knock-out elements located on a second surface of the base member inside a diameter of one of a plurality of nested second flanges, the one or more second knock-out elements being removable from the base member to form a second aperture therein.

41. A junction box according to claim 40 comprising a slot extending through one of the plurality of nested first flanges.

42. A junction box according to claim 40 wherein the lid member and base member are hingedly coupled on one side, the junction box comprising a clasp assembly on a side opposed to the one side, the clasp assembly comprising:

a base clasp flange extending outwardly from the base member;

a lid clasp flange extending outwardly from the lid member; and an intermediate clasp member, wherein the base clasp flange and the lid clasp flange may both be independently locked to, and unlocked from, the intermediate clasp member.

43. A junction box according to claim 39, wherein at least one of the plurality of nested first flanges is removable with the one or more first knock-out elements.

* * * * *